US012574481B2

(12) United States Patent
Oberascher et al.

(10) Patent No.: US 12,574,481 B2
(45) Date of Patent: *Mar. 10, 2026

(54) DIGITAL DISPLAY SYSTEM AND METHOD

(71) Applicant: TEXAS INSTRUMENTS INCORPORATED, Dallas, TX (US)

(72) Inventors: Kristofer Scott Oberascher, Van Alstyne, TX (US); Gregory Scott Pettitt, Sherman, TX (US); Jeffrey Matthew Kempf, Dallas, TX (US); Michael Terry Davis, Richarson, TX (US); Xi Zhou, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,205

(22) Filed: Aug. 11, 2023

(65) Prior Publication Data

US 2023/0388460 A1 Nov. 30, 2023

Related U.S. Application Data

(63) Continuation of application No. 17/085,483, filed on Oct. 30, 2020, now Pat. No. 11,765,325.

(60) Provisional application No. 63/047,328, filed on Jul. 2, 2020, provisional application No. 62/929,607, filed on Nov. 1, 2019.

(51) Int. Cl.
*H04N 9/31* (2006.01)
*G03B 21/20* (2006.01)

(52) U.S. Cl.
CPC ....... *H04N 9/3117* (2013.01); *G03B 21/2066* (2013.01); *H04N 9/3158* (2013.01)

(58) Field of Classification Search
None
See application file for complete search history.

(56) References Cited

U.S. PATENT DOCUMENTS

| | | | |
|---|---|---|---|
| 6,642,969 B2 * | 11/2003 | Tew ..................... | H04N 9/3117 |
| | | | 348/743 |
| 6,771,325 B1 | 8/2004 | Dewald | |
| 7,048,385 B2 * | 5/2006 | Beeson .............. | G03B 21/2033 |
| | | | 349/5 |
| 7,066,605 B2 | 6/2006 | Dewald | |
| 7,085,483 B2 | 8/2006 | Terashima | |
| 7,543,943 B1 * | 6/2009 | Hubby, Jr. ............. | G03B 21/28 |
| | | | 348/743 |

(Continued)

FOREIGN PATENT DOCUMENTS

CN 107765500 A 3/2018

OTHER PUBLICATIONS

International Search Report and Written Opinion dated Sep. 30, 2021, PCT Application No. PCT/US2021/038226, 8 pages.

*Primary Examiner* — Justin W Rider
(74) *Attorney, Agent, or Firm* — Michael T. Gabrik; Frank D. Cimino

(57) ABSTRACT

A system includes a color filter including a first segment configured to transmit first light having a first color and to reflect second light having a second color and a second segment configured to transmit the second light having the second color and to reflect the first light having the first color. The system also includes an integrator rod optically coupled to the color filter, a reflective surface having an aperture on an end of the integrator rod.

20 Claims, 23 Drawing Sheets

(56)                    References Cited

U.S. PATENT DOCUMENTS

| | | | | |
|---|---|---|---|---|
| 9,268,074 B2* | 2/2016 | Nagato | ................. | G02B 5/284 |
| 2005/0046981 A1* | 3/2005 | Karube | ............... | H04N 9/3117 |
| | | | | 359/885 |
| 2005/0082990 A1* | 4/2005 | Elliott | ................. | G02B 26/008 |
| | | | | 313/326 |
| 2005/0280785 A1* | 12/2005 | Beeson | ................. | G03B 33/10 |
| | | | | 348/E9.027 |
| 2007/0002285 A1* | 1/2007 | Dewald | ................. | H04N 9/315 |
| | | | | 348/E9.027 |
| 2007/0268465 A1* | 11/2007 | Dewald | ............. | G03B 21/2066 |
| | | | | 348/743 |
| 2013/0242534 A1* | 9/2013 | Pettitt | ................. | G02B 27/141 |
| | | | | 362/84 |
| 2014/0211169 A1* | 7/2014 | Kitano | ................ | H04N 9/3114 |
| | | | | 353/31 |
| 2014/0347634 A1* | 11/2014 | Bommerbach | ...... | G03B 21/208 |
| | | | | 353/121 |
| 2016/0119595 A1* | 4/2016 | Lyubarsky | ......... | G02B 27/0961 |
| | | | | 353/121 |
| 2018/0299758 A1* | 10/2018 | Liao | .................... | G03B 21/204 |
| 2019/0155136 A1* | 5/2019 | Bhakta | ................ | G03B 21/204 |
| 2020/0019049 A1* | 1/2020 | Liu | ....................... | G02B 27/10 |
| 2020/0089091 A1* | 3/2020 | Jao | .................... | G03B 21/2013 |
| 2020/0159101 A1* | 5/2020 | Fan | ........................... | F21V 9/40 |
| 2021/0037222 A1* | 2/2021 | Huang | ............. | G02B 27/1013 |

* cited by examiner

116

150

260

250

350

351

352

353

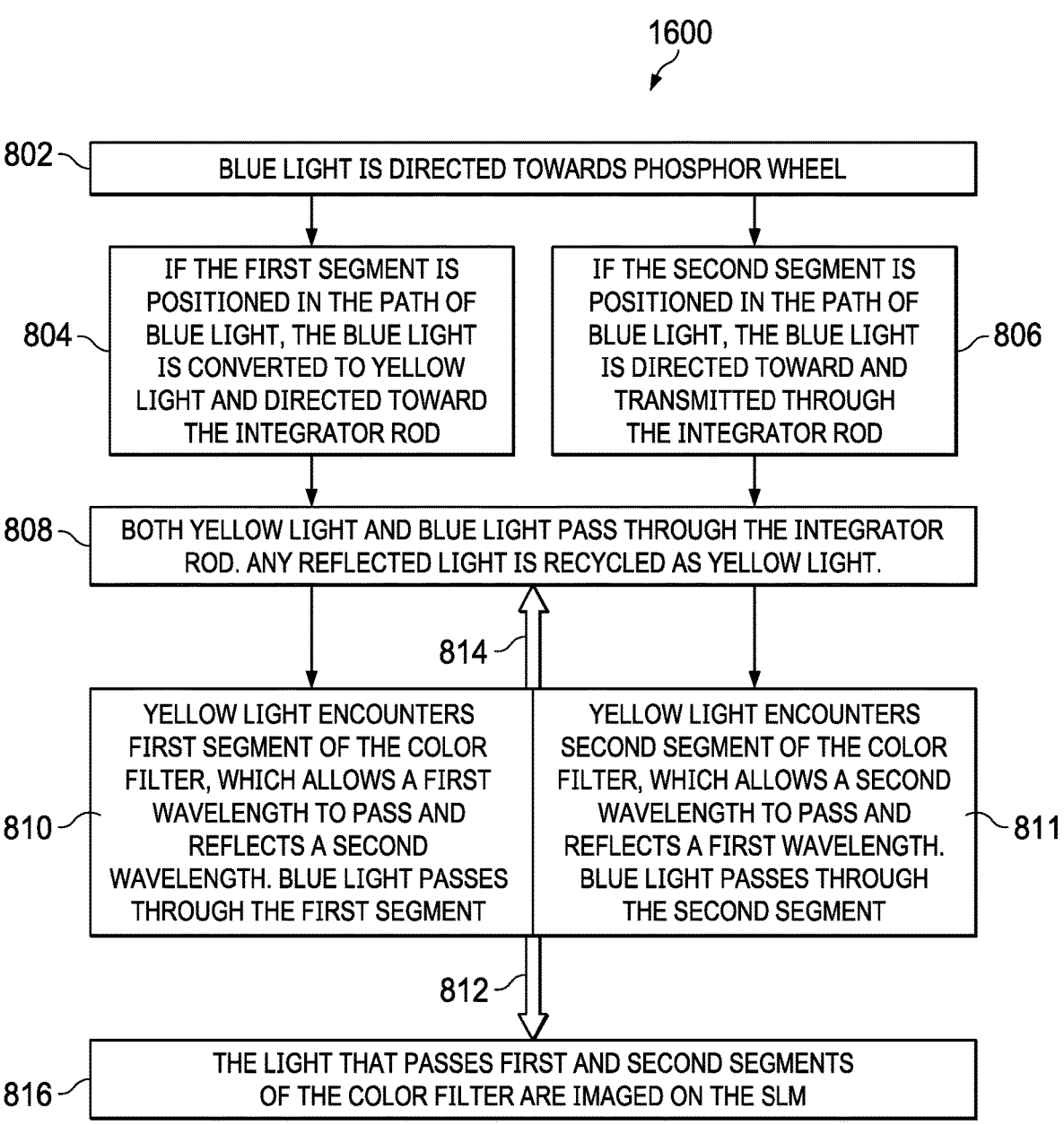

1600

802 — BLUE LIGHT IS DIRECTED TOWARDS PHOSPHOR WHEEL

804 — IF THE FIRST SEGMENT IS POSITIONED IN THE PATH OF BLUE LIGHT, THE BLUE LIGHT IS CONVERTED TO YELLOW LIGHT AND DIRECTED TOWARD THE INTEGRATOR ROD

806 — IF THE SECOND SEGMENT IS POSITIONED IN THE PATH OF BLUE LIGHT, THE BLUE LIGHT IS DIRECTED TOWARD AND TRANSMITTED THROUGH THE INTEGRATOR ROD

808 — BOTH YELLOW LIGHT AND BLUE LIGHT PASS THROUGH THE INTEGRATOR ROD. ANY REFLECTED LIGHT IS RECYCLED AS YELLOW LIGHT.

814

810 — YELLOW LIGHT ENCOUNTERS FIRST SEGMENT OF THE COLOR FILTER, WHICH ALLOWS A FIRST WAVELENGTH TO PASS AND REFLECTS A SECOND WAVELENGTH. BLUE LIGHT PASSES THROUGH THE FIRST SEGMENT

811 — YELLOW LIGHT ENCOUNTERS SECOND SEGMENT OF THE COLOR FILTER, WHICH ALLOWS A SECOND WAVELENGTH TO PASS AND REFLECTS A FIRST WAVELENGTH. BLUE LIGHT PASSES THROUGH THE SECOND SEGMENT

812

816 — THE LIGHT THAT PASSES FIRST AND SECOND SEGMENTS OF THE COLOR FILTER ARE IMAGED ON THE SLM

FIG. 19

DIGITAL DISPLAY SYSTEM AND METHOD

This application is a Continuation of U.S. Non-Provisional application Ser. No. 17/085,483 filed Oct. 30, 2020, which claims benefit of priority to U.S. Provisional Application No. 62/929,607 filed Nov. 1, 2019 and U.S. Provisional Application No. 63/047,328 filed Jul. 2, 2020, which applications are hereby incorporated herein by reference in their entirety.

SUMMARY

A system includes a color filter including a first segment configured to transmit first light having a first color and to reflect second light having a second color and a second segment configured to transmit the second light having the second color and to reflect the first light having the first color. The system also includes an integrator rod optically coupled to the color filter, a reflective surface having an aperture on an end of the integrator rod.

A system includes a light source configured to produce first light having a first color and second light having a second color. The system also includes a color filter optically coupled to the light source, the color filter having a first segment configured to transmit the first light having the first color and to reflect the second light having the second color to produce first reflected light and a second segment configured to transmit the second light having the second color and to reflect the first light having the first color to produce second reflected light. Additionally, the system includes an integrator rod optically coupled between the light source and the color filter, the integrator rod configured to transmit the first light towards the color filter, transmit the second light towards the color filter, direct the first reflected light towards the color filter, and direct the second reflected light towards the color filter.

A system includes a color filter including a first segment configured to transmit first light having a first color and to reflect second light having a second color and a second segment configured to transmit the second light having the second color and to reflect the first light having the first color. The system also includes an integrator rod optically coupled to the color filter, a reflective surface having an aperture on an end of the integrator rod and a spatial light modulator (SLM) optically coupled to the color filter.

BRIEF DESCRIPTION OF THE DRAWINGS

For a detailed description of various examples, reference will now be made to the accompanying drawings in which:

FIG. 19 illustrates a flow diagram depicting one embodiment of a method for the operation of the FIG. 5A digital display system.

DETAILED DESCRIPTION

Aspects of the disclosure relate generally to digital display systems having improved efficiencies by recycling reflected light in a system and enabling for the reuse of that otherwise unused reflected light onto a spatial light modulator (SLM), such as, for example, an N×M array of micromirrors of a digital micromirror device (DMD) (e.g., a DLP™ device from Texas Instruments) or a liquid crystal on silicon (LCoS).

Figure 1:
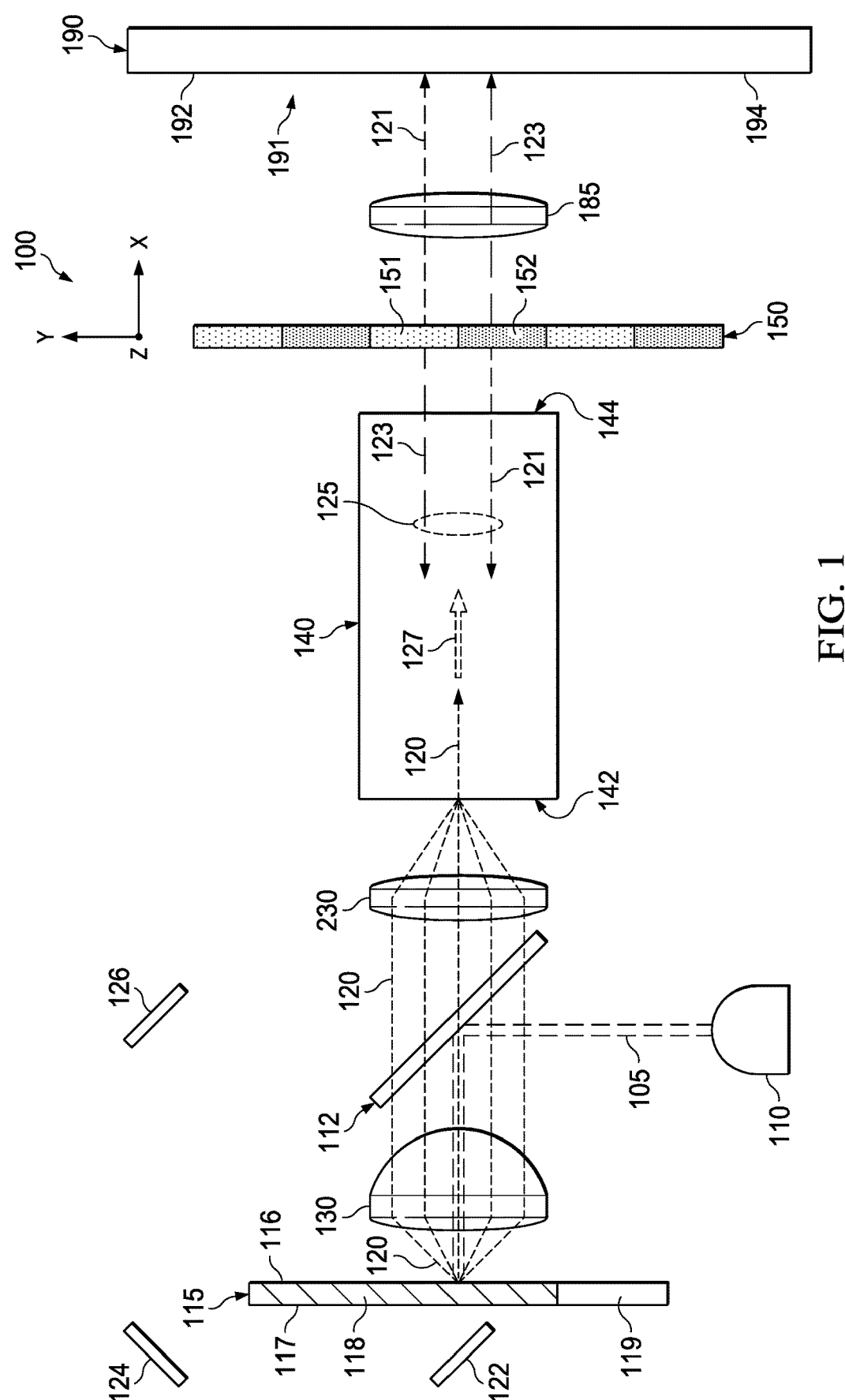
FIG. 1 illustrates a digital display system in accordance with the present disclosure.

FIG. 1 is an example of a side view of a digital display system 100 illustrated as having a path of light from a phosphor member (in this case a rotatable phosphor wheel 115) through a light-propagating device (in this example an integrator rod 140) and onto a spatial light modulator (SLM) 190. The integrator rod 140 is a solid glass rod having total internal reflection (TIR) properties. Other light-propagating devices may be used, such as, for example, a fly's eye array, a hollow light tunnel, or solid light pipe. The x-y-z coordinates are provided wherein the x-axis is intended to be substantially parallel to an optical path of light that is substantially collimated by a first lens 130 to a second lens 230 that focuses light towards the integrator rod 140 for ease of explanation of the enclosed examples. The light path is further described below. It should be noted that FIG. 1 is only meant as an example as other implementations may use additional reflective surfaces to change the angle of the path of light so that it reaches the SLM 190 (and other additional devices like an actuator or projection screen, as discussed below). As such, the path of light (and the x-y-z coordinates) may change in other implementations in accordance with the examples discussed herein.

The SLM 190 includes a receiving face 191 that is substantially perpendicular to the x-axis. The SLM's receiving face 191 extends along the y-axis in its height and extends along the z-axis in its width. It should be noted that the orientation and the drawings are only exemplary as other implementations could include different angles and different mirrors that display images on a display.

In one example, a light source 110 includes at least one blue laser diode that emits blue light 105 that reflects off of a dichroic mirror 112 and is focused by a first lens 130 towards a phosphor wheel 115. The dichroic mirror 112 reflects blue light and transmits yellow light. As illustrated, blue light 105 is shown as a blue laser light and is directed vertically (i.e., along the y-axis and substantially perpendicular to the x-axis) towards the dichroic mirror 112 that is shown in FIG. 1 as having a 450 angle tilt (relative to the x-axis), causing blue light 105 to be directed towards the phosphor wheel 115 and along a path substantially parallel to the x-axis. Phosphor wheel 115 includes a first face 116 that reflects light substantially parallel to the x-axis and back towards a first lens 130. Phosphor wheel 115 also includes a second face 117 that is substantially opposite of the first face 116. The first and second faces 116 and 117 extend along the y-axis in their height and extend along the z-axis in their width (or radius). Also illustrated are first segments 118 and second segments 119 of the phosphor wheel 115.

Figure 2:
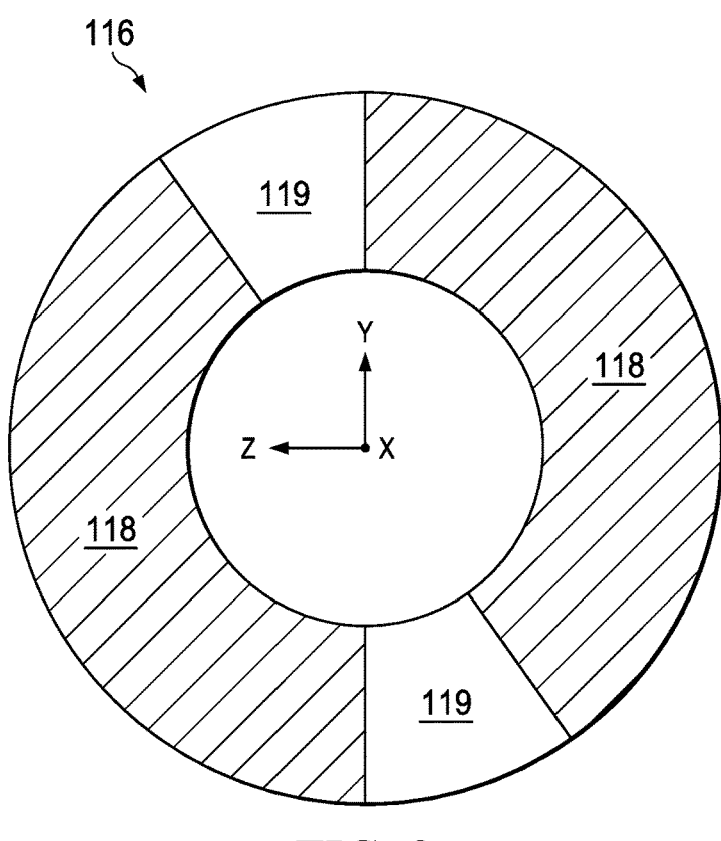
FIG. 2 illustrates a plan view of a phosphor wheel.

FIG. 2 shows a plan view of the first face 116 of the phosphor wheel 115 as having first segments 118 and second segments 119. As illustrated, first segments 118, which are reflective, are formed of a phosphor material, while second segments 119 are composed of a transparent material. The phosphor wheel 115 is rotatable about a center axis (shown as rotatable about the x-axis in FIG. 2) such that the first and second segments 118, 119 are positioned in the path of the blue light 105. It should be noted that while the phosphor wheel 115 is illustrated as having two of each first and second segments 118, 119, respectively, the phosphor wheel may have an additional number of first and second segments 118, 119, respectively; for example, it could have three, four, or more of each first and second segments 118, 119, respectively. The angles through which the first and second segments 118, 119, respectively, extend are dependent upon the color filter selection.

Referring back to FIG. 1, when the phosphor wheel 115 is rotated to be in the path of blue light 105, blue light 105 strikes the first segment 118 (FIG. 2), and is converted into yellow light 120 that contains red light 121 and green light 123. Yellow light 120 is reflected off the first segment 118 at one or more angles back towards first lens 130 proximate to the phosphor wheel 115. When the blue light 105 encounters the second segments 119, it is transmitted. Accordingly, the phosphor wheel 115 produces alternating timeslots of blue light 105 and yellow light 120. The first lens 130 collimates the incoming light and allows the light to pass to a second lens 230 through the dichroic mirror 112. The second lens 230 focuses the collimated light to a light-receiving end 142 of the integrator rod 140, where it is further homogenized or mixed. As the yellow light 120 travels through the integrator rod 140, the yellow light 120 is reflected by the sides of the integrator rod 140, becoming homogenous. The yellow light 120 passes through integrator rod 140 and out through its light-transmitting end 144 towards the SLM 190. As discussed above, the integrator rod 140 is solid and has TIR properties allowing the yellow light 120 to undergo total internal reflection at the interface between the integrator rod 140 and the air surrounding the integrator rod 140. In other examples, the integrator rod is hollow, and mirrored internal surfaces propagate the yellow light 120 traveling through the integrator rod. In other examples, a light tunnel or light pipe having mirrored or reflective surfaces is used to transmit yellow light 120 and recycled yellow light 127 to the color filter and display in place of the integrator rod 140.

Figure 3:
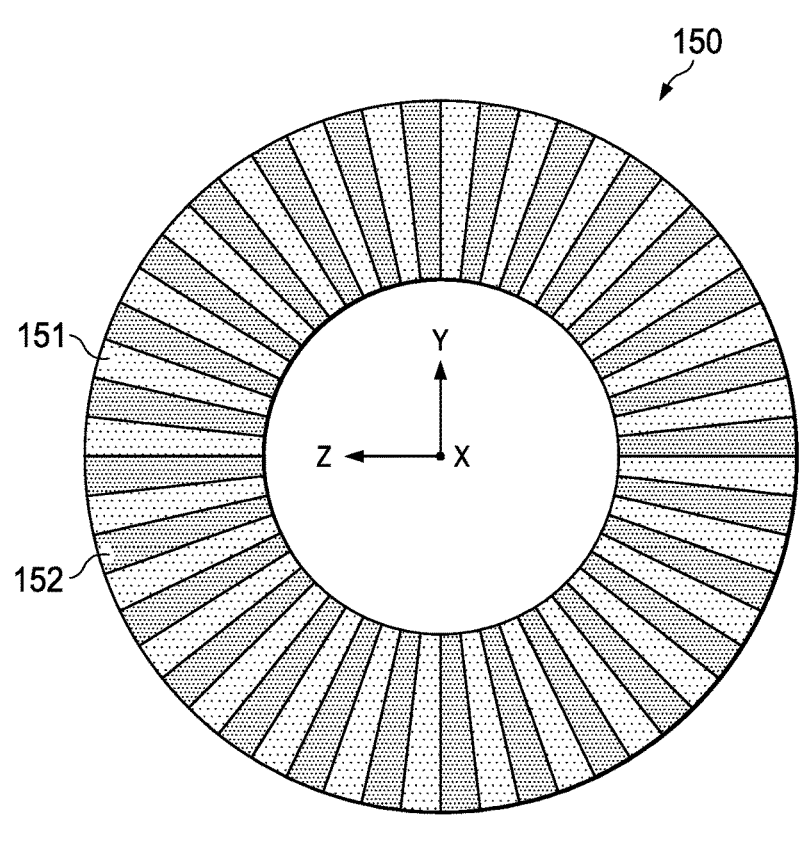
FIG. 3 illustrates a plan view of a color filter in accordance with the present disclosure.

A color filter 150, having at least two segments (first and second segments 151 and 152, respectively), is optically coupled between the integrator rod 140 and the SLM 190. FIG. 3 shows a plan view of the color filter 150 with first and second segments 151 and 152, respectively, capable of selectively transmitting and reflecting first and second wavelengths of light while permitting a third, different, wavelength to pass therethrough (discussed below with respect to FIG. 4). For example, as illustrated in FIG. 1, first segment 151 is a magenta filter that transmits red light 121 while reflecting green light 123 and second segment 152 could be a cyan filter that transmits green light 123 while reflecting red light 121. Both first and second segments 151 and 152 transmit blue light 105, as discussed below with respect to FIG. 4. It should be noted that while the color filter 150 is illustrated as having first and second segments 151 and 152, respectively, additional segments can be included to allow secondary colors through the filter and towards the SLM. The angles through which the first and second segments 151, 152, respectively, extend are dependent upon the color filter geometry performance. In addition, while the first and second segments 151, 152, respectively, are shown as having similar dimensions, it should be noted that the angles through which they extend could vary from one another depending on system color performance requirements.

Referring back to FIG. 1, the color filter 150 transmits two different wavelengths simultaneously to the SLM 190. The different wavelengths can be transmitted to different portions of the SLM 190 by rotating color filter 150 about a center axis (shown as rotatable about the x-axis in FIG. 3) and thereby changing the positions of the color filter segments. For example, FIG. 1 illustrates a magenta filter 151 transmitting red light 121 to a top portion 192 (or a first portion) of SLM 190 and a cyan filter 152 transmitting green light 123 to a bottom portion 194 (or a second portion) of SLM 190. The color filter 150 can be rotated such that a magenta filter 151 takes the position of the cyan filter 152 and transmits red light 121 to the bottom portion 194 of SLM 190 and a cyan filter 152 takes the position of the magenta filter 151 and transmits green light 123 to the top portion 192 of SLM 190. As discussed above, the yellow light 120 contains green light and red light. As the yellow light passes through the color filter 150, the green light of the yellow light 120 is separated from the red light of the yellow light 120, and they are sent to separate portions of the SLM 190. When blue light 105 passes through the filter, it is passed through both the magenta filter 151 and the cyan filter 152, and is passed to both the top portion 192 and the bottom portion 194 of the SLM 190. As shown, the top portion 192 is located above the bottom portion 194 as measured along the y-axis. Relay optics 185 are used to form an image of the rotating filter pattern onto the SLM 190. The rotating color filter 150 may rotate at speeds of 60 Hz, 120 Hz, 180 Hz or higher.

Figure 4:
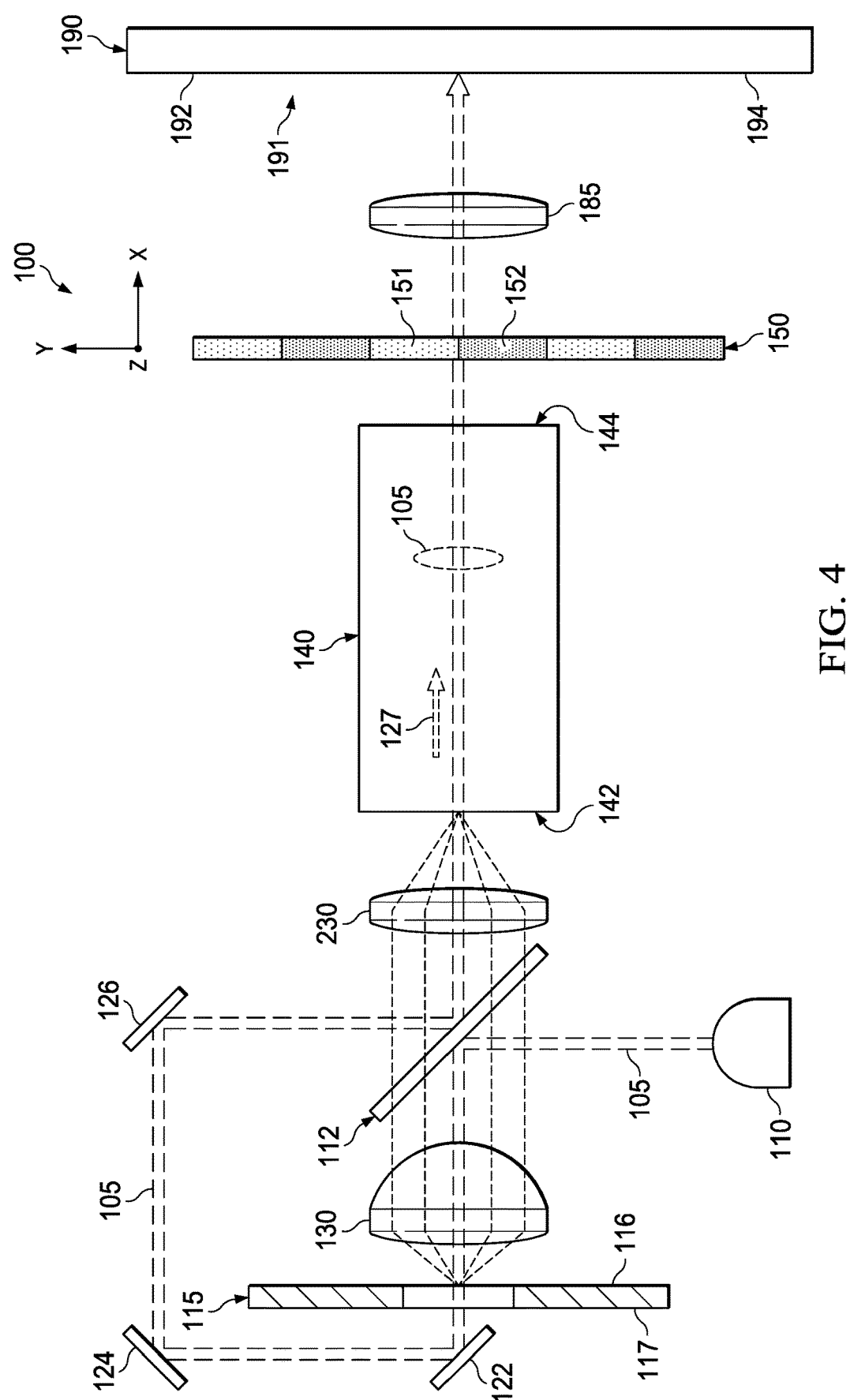
FIG. 4 illustrates a further operation of the FIG. 1 image display system.

FIG. 4 illustrates the path of a third wavelength of light, for example blue light, when the phosphor wheel 115 is rotated such that the second segment 119 is in the path of blue light 105. As illustrated, blue light 105 is transmitted through second segment 119 of the otherwise reflective phosphor wheel and is transmitted to be reflected off a series of mirrors 122, 124, 126, and dichroic mirror 112. Mirrors 122, 124, 126 and dichroic mirror 112 reflect blue light 105 towards second lens 230, which focuses light towards the integrator rod 140. The blue light 105 is passed to the light-receiving end 142 of the integrator rod 140. The blue light 105 passes through integrator rod 140 and to its light-transmitting end 144 towards the SLM 190. As illustrated, blue light 105 includes blue light and passes through both magenta and cyan segments of color filter 150 (i.e., first and second segments 151 and 152, respectively) and onto SLM 190.

As discussed above, the phosphor wheel 115 is rotated such that the first and second segments 118, 119, respectively, are in the pathway of the blue light 105 coming from light source 110. When blue light 105 strikes first segment 118, it is reflected into the system as yellow light 120. When blue light 105 strikes second segment 119, it is allowed to pass through and be transmitted to mirrors 122, 124, 126 and reflected from dichroic mirror 112 to the integrator rod 140.

Referring back to FIG. 1, as yellow light 120 encounters the color filter 150, some of the red and green light, 121 and 123, respectively, is reflected back towards phosphor wheel 115 as reflected light 125 passing through, for example, the other elements of the digital display system in the pathway from the color filter 150 to the phosphor wheel 115 including the second and first lenses 230, 130, respectively, and the dichroic mirror 112. The examples described herein allow for reflected light 125 to be recycled as yellow light and retransmitted and redirected towards the color filter 150 as recycled yellow light 127. For example, any reflected light 125 striking the first segment 118 of the phosphor wheel 115 is reflected towards the first lens 130, as recycled yellow light 127. The first lens 130 collimates the incoming recycled yellow light 127 and allows the recycled yellow light 127 to pass to a second lens 230 via the dichroic mirror 112. The second lens 230 focuses the collimated recycled yellow light 127 to a light-receiving end 142 of the integrator rod 140, where it may be further homogenized or mixed. The recycled yellow light 127 is allowed to pass through integrator rod 140 and to the light-transmitting end 144 towards the color filter 150. As recycled yellow light 127 encounters the color filter 150, some of the red and green light, 121 and 123, respectively, is reflected towards phosphor wheel 115 as reflected light 125, and the process begins anew until the reflected light has dissipated into the ambient. This recycling process improves the efficiency of the digital display system 100 and improves brightness of the image on the SLM 190.

The reflected light 125 may also strike the second segment 119 of the phosphor wheel 115, which will transmit through the phosphor wheel 115 and reflect off mirrors 122, 124, and 126 and pass through dichroic mirror 112 (along the path taken by blue light 105 in FIG. 4). A device (for example a mirror (not shown)) can redirect any reflected light 125 towards the phosphor wheel 115 to capture any reflected light 125 that passes through dichroic mirror 112 and recycle it into the digital display system 100. The reflected light 125 is directed to the phosphor wheel 115, which is recycled as recycled yellow light 127 as discussed above. Specifically, the recycled yellow light 127 is reflected towards the first lens 130. The first lens 130 collimates the incoming recycled yellow light 127 and allows the recycled yellow light 127 to pass to a second lens 230 via the dichroic mirror 112. The second lens 230 focuses the recycled yellow light 127 to a light-receiving end 142 of the integrator rod 140, where it may be further homogenized or mixed. The recycled yellow light 127 is allowed to pass through integrator rod 140 and to the light-transmitting end 144 towards the color filter 150. As recycled yellow light 127 encounters the color filter 150, some of the red and green light, 121 and 123, respectively, is reflected towards phosphor wheel 115 as reflected light 125, and the recycling process begins anew until the reflected light has dissipated into the ambient. This recycling process improves the efficiency of the digital display system 100 and improves brightness of the image on the SLM 190.

The color filter 150 rotates in synchronism with the speed of operation of the SLM 190 to project the red, green, and blue light for integration into a composite color image on a display surface. During a first timeslot, the SLM 190 simultaneously forms a red image using the red light 121 at the top portion 192, and a green image using the green light 123 at the bottom porting 194. During a second timeslot, the SLM forms a blue image using the blue light 105 at both the top portion 192 and the bottom portion 194. The rotation of the color filter 150 is detected by an index mark detector or some other sensing mechanism such as measurement or signals from a color wheel motor. For example, one such detector could be an infrared (IR) sensor monitoring the index mark on the motor hub.

Also shown in FIGS. 1 and 4 are relay optics 185 that relay an image of the wheel pattern on SLM 190. SLM 190 could be, as discussed above, a digital micromirror device (DMD) having an N×M array of micromirrors of a digital micromirror device (DMD) (e.g., a DLP™ device from Texas Instruments). A DMD chip has on its surface several hundred thousand micromirrors arranged in a rectangular array. These micromirrors correspond to the pixels in the image to be displayed. The micromirror can be individually rotated to an on or off state. The micromirrors themselves are around 16 micrometers across. Each one is mounted on a yoke which in turn is connected to two support posts by compliant torsion hinges and twistable twists in the middle. By tilting the micromirrors, each micromirror can toggle in the on and off state. In the on state, the light from the color filter 150 is reflected into the lens making the pixel appear bright on a screen. In the off state, the light from the color filter 150 is directed elsewhere (usually onto a heatsink), making the pixel appear dark.

In other examples, other types of spatial light modulator devices can be used. For example, liquid-crystal-on-silicon (LCoS) devices can be used. These devices, like the digital micromirror devices, are reflective elements that can be individually controlled to modulate the image into the projected light rays. LCoS are reflective active-matrix liquid crystal displays using liquid crystal on top of silicon. Instead of dynamic mirrors, a controller can control properties of pixels to either turn them on or off for redirecting light towards a projection screen (not shown).

Figure 5A:
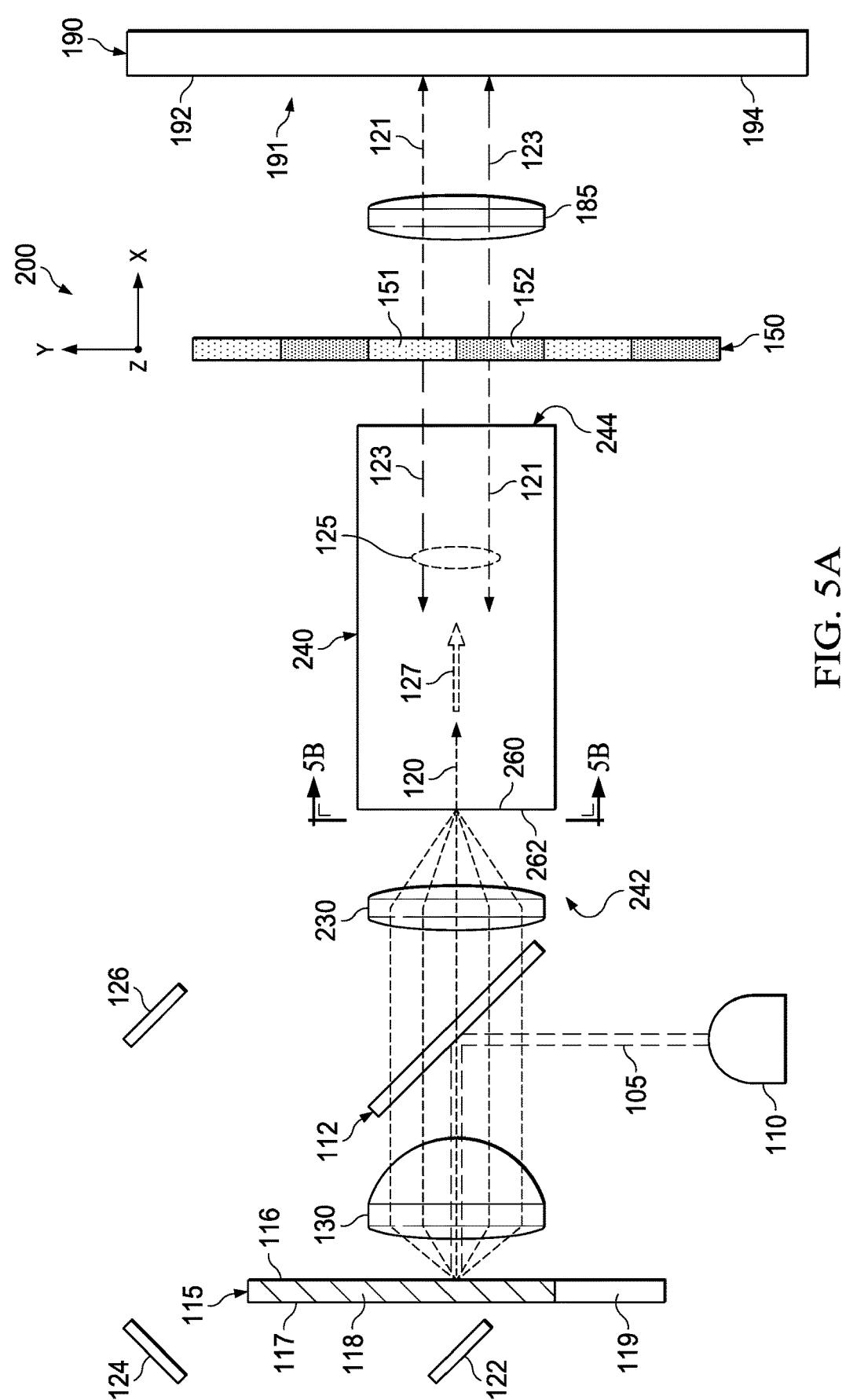
FIG. 5A illustrates a digital display system having a recycling integrator rod in accordance with the present disclosure.
Figure 5B:
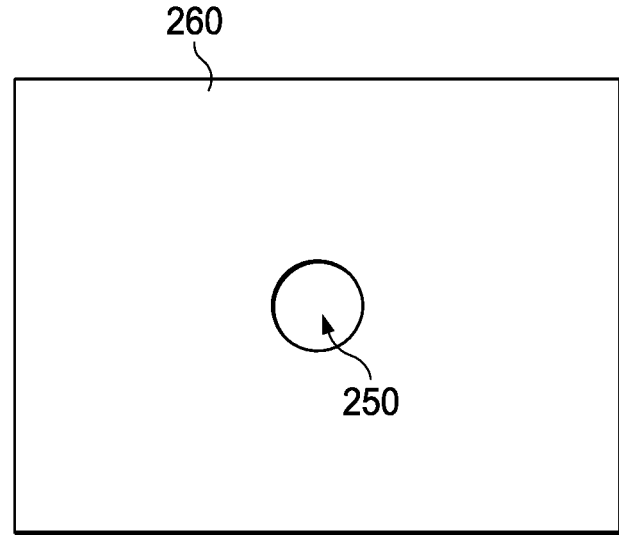
FIG. 5B illustrates a reflective interior face of the recycling integrator rod of the FIG. 5A system.

FIGS. 5A and 5B illustrate an alternative digital display system 200 that incorporates an integrator rod 240, which includes an internal face 260 that has a reflective surface (described below). Like the integrator rod of FIG. 1 (integrator rod 140), integrator rod 240 extends along the x-axis and includes a light receiving end 242 and a light transmitting end 244. Unlike the integrator rod 140, the integrator rod 240 has an aperture at the light receiving end 242. As illustrated in FIG. 5A, light receiving end 242 is proximate to the phosphor wheel 115 while light transmitting end 244 is proximate to the SLM 190. The light receiving end 242 has an internal face 260 that transmits light towards the light transmitting end 244. FIG. 5B illustrates a plan view taken along line 5B-5B of FIG. 5A that shows the internal face 260 as a reflective surface having an aperture 250 that facilitates yellow light 120 and blue light 105 entering the integrator rod. While the aperture 250 is illustrated as round, other implementations could include an oval, a triangle, a quadrangle, or any other shaped aperture suited for the application.

The integrator rod 240 is a solid glass rod located between the light receiving end 242 and the light transmitting end 244 and has total internal reflective (TIR) properties. The internal face 260 is substantially reflective and reflects reflected light 125 towards the light transmitting end 244. The reflective internal face 260 reduces the amount of reflected light 125 that travels to the phosphor wheel 115 (as illustrated in FIG. 1). The light reflected from the internal face 260 of integrator rod 240 is homogenized and is directed and transmitted towards the light transmitting end 244 as recycled yellow light 127. Like yellow light 120 (FIG. 1), recycled yellow light 127 encounters the color filter 150 where some of the red and green light (121 and 123, respectively) is transmitted towards the SLM 190 while some red and green light is reflected from the color filter as reflected light 125, and the recycling process begins anew until the reflected light has dissipated into the ambient. This recycling process improves the efficiency of the digital display system 200 and improves brightness on the SLM 190.

The integrator rod 240 may not have an internal face 260 that is reflective; instead, it may have a film or coating on the exterior surface 262 of the integrator rod 240 that is substantially reflective. As discussed above, any reflected light 125 within the integrator rod will be reflected towards the color filter 150 as recycled yellow light 127. The light is passed through the color filter 150 towards the SLM 190. In addition, as discussed above, a hollow light tunnel could be used as an alternative to a glass rod.

Figure 6B:
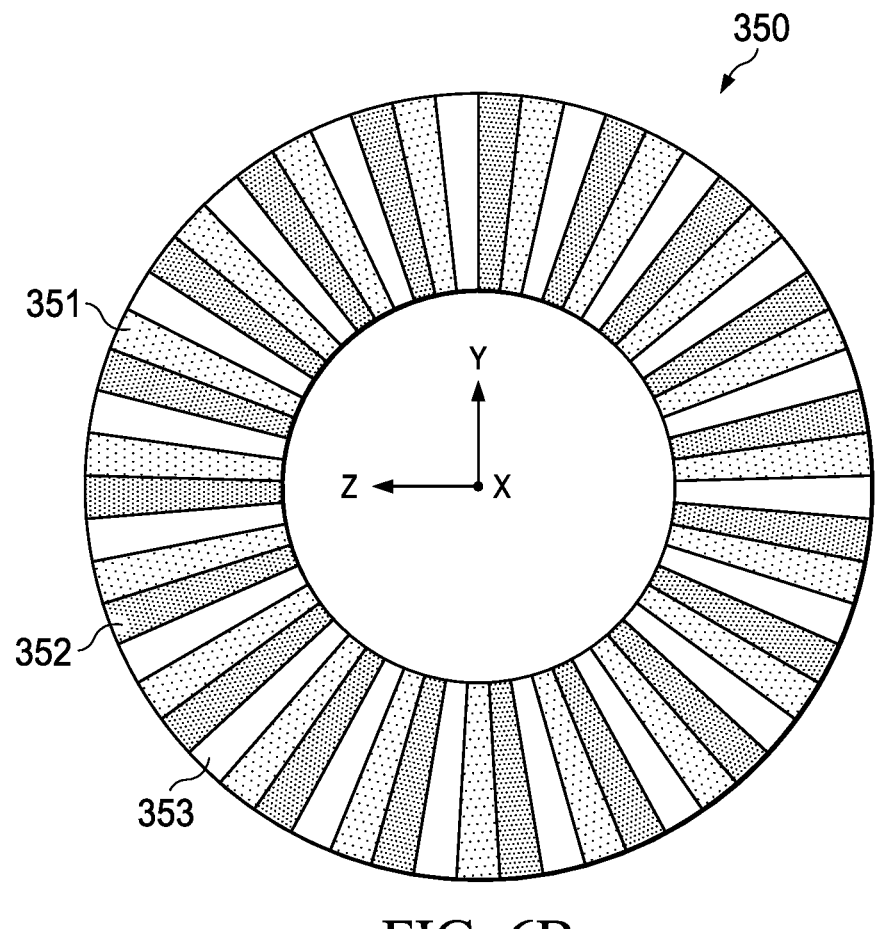
FIG. 6B illustrates a plan view of the color filter of the FIG. 6A system in accordance with the present disclosure.
Figure 6A:
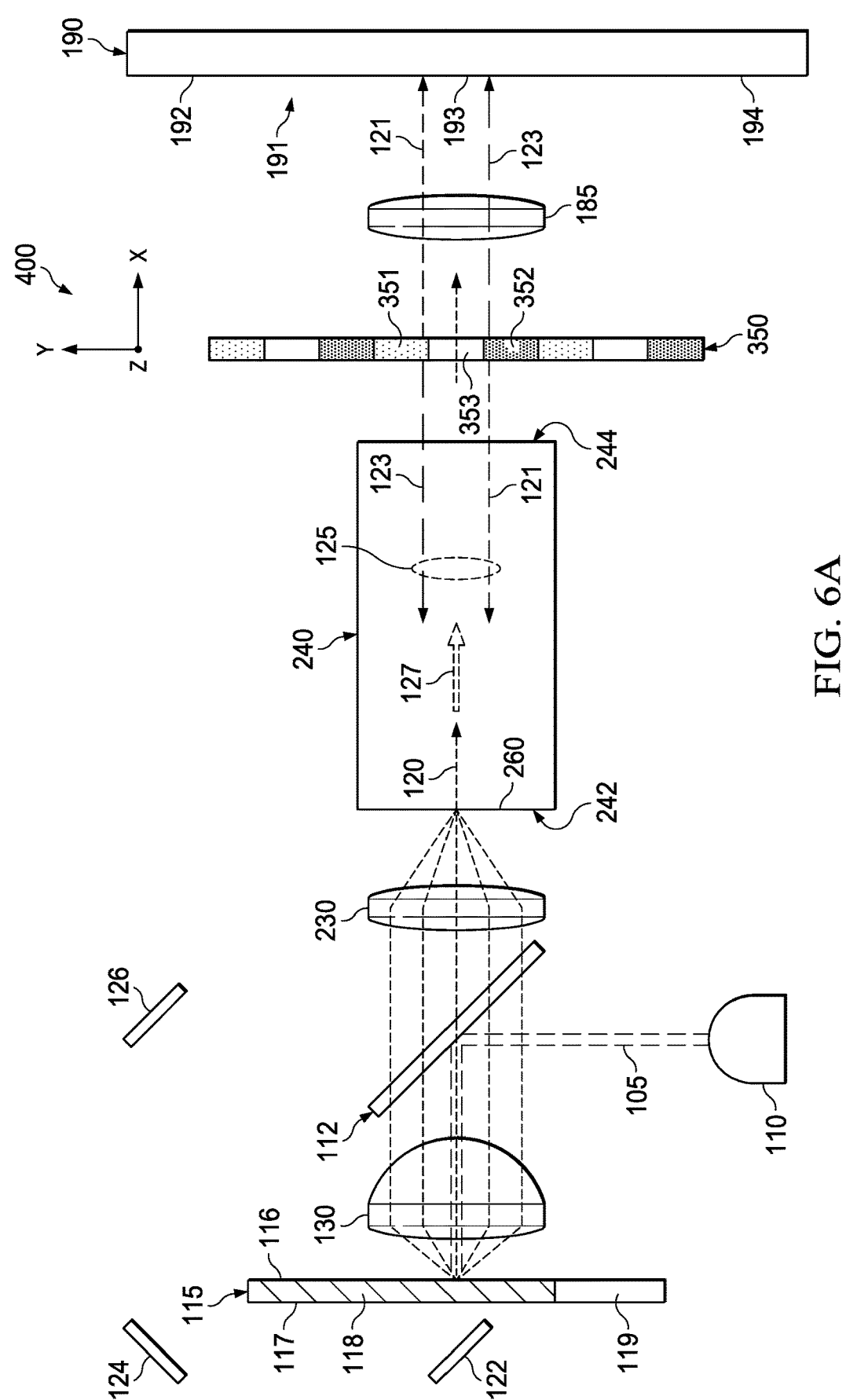
FIG. 6A illustrates a digital display system having a color filter in accordance with the present disclosure.

In yet another example, illustrated in FIGS. 6A and 6B, an alternative digital display system 400 has a color filter 350, having first, second, and third segments (351, 352, 353, respectively), disposed between the integrator rod 240 (discussed above with respect to FIGS. 5A and 5B) and the SLM 190. In another example, the color filter 350 is used with the integrator rod 140. As shown illustrate in FIGS. 6A and 6B, the first, second, and third segments 351, 352, 353, respectively, are in an alternating sequence. As shown, and similar to the FIG. 3 color filter 150, color filter 350 has first, second and third segments 351, 352, 353, respectively, capable of transmitting first, second, and third wavelengths of light. First, second and third segments 351, 352, 353 are all also capable of transmitting a fourth wavelength of light, which is different from the first, second, and third wavelengths of light. For example, as illustrated in FIG. 6A, first segment 351 could be a magenta filter that transmits red and blue light 121 and 105 while reflecting green light 123 and second segment 352 could be a cyan filter that transmits green and blue light 123 and 105 while reflecting red light 121. In addition, color filter 350 has a third segment 353 that transmits yellow light 120 (including red light and green light) and blue light 105. The third segment 353 could be a clear segment. As shown in FIG. 6A, the color filter 350 transmits at least three different wavelengths simultaneously to different portions of the SLM 190. In addition, the color filter 350 can rotate about an axis (FIG. 6B) similar to the FIG. 3 color filter 150.

As color filter 350 rotates, different wavelengths of light are transmitted to different portions of the SLM 190. For example, while FIG. 6A illustrates a first segment 351 that transmits red light 121 to a top portion 192 of SLM 190, a second segment 352 that transmits green light 123 to a bottom portion 194 of SLM 190, and a third segment 353 that transmits yellow light 120 to a middle portion 193 of SLM 190, the color filter 350 can be rotated such that different wavelengths can be transmitted to different portions (192, 193, 194) of the SLM 190.

As discussed above with respect to FIG. 4, the FIG. 6A configuration allows for blue light 105 to pass through the phosphor wheel 115, reflect off mirrors 122, 124 126 and dichroic mirror 112, and pass towards and through the integrator rod 240 (FIG. 5A) along the x-axis and towards the SLM 190. As discussed above, the phosphor wheel 115 of 6A rotates and blue light 105 either strikes first segment 118 and is converted to yellow light 120 or blue light 105 passes through second segment 119 and is directed to mirrors 122, 124, 126 and dichroic mirror 112; blue light 105 is then reflected towards integrator rod 240 and towards the involute color filter 450. Blue light 105 passes through first, second, and third segments (351, 352, and 353, respectively) to the SLM 190. Accordingly, the illustrated digital display system 400 can transmit at least four wavelengths of light. Other implementations could include Archimedean color filters as disclosed in co-assigned U.S. Pat. No. 6,642,969B2 incorporated by reference in its entirety, as can any of the color filters discussed and disclosed herein. In addition, while discussed and described as transmitting at least four different wavelengths of light, other implementations could include additional and/or different wavelengths in accordance with the intended operation.

Figure 7A:
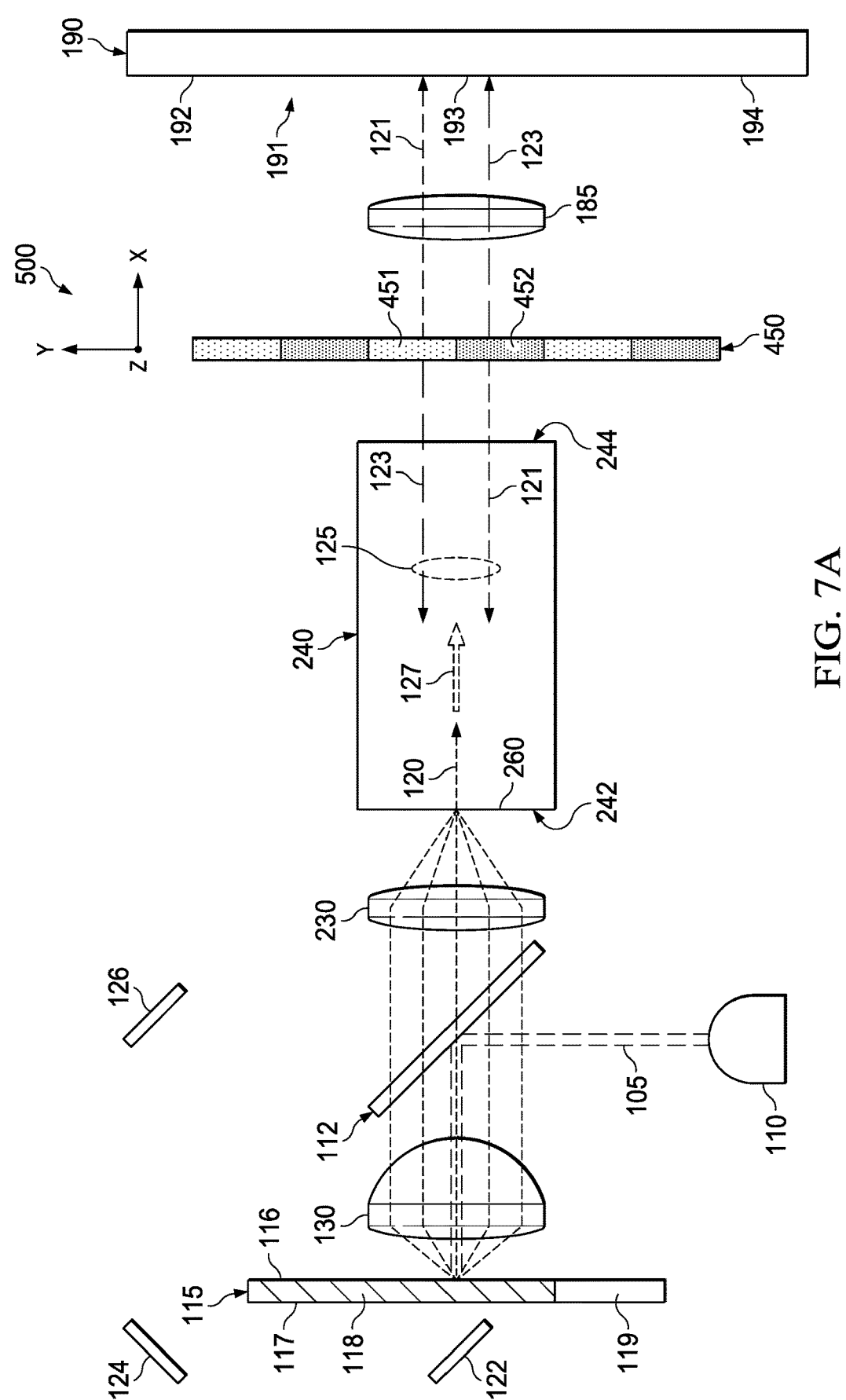
FIG. 7A illustrates a digital display system having an involute color filter in accordance with the present disclosure.
Figure 7B:
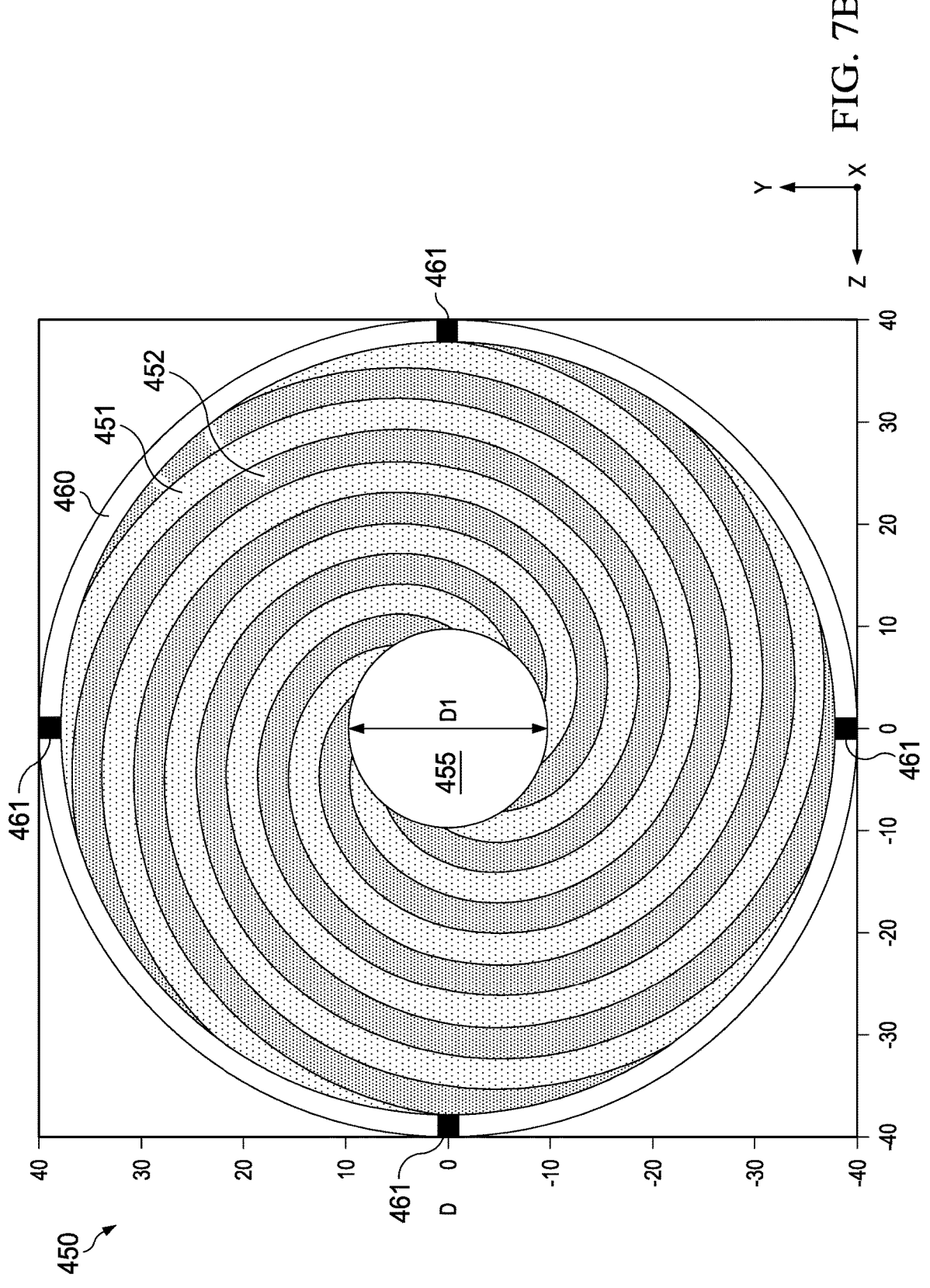
FIG. 7B illustrates a plan view of the FIG. 7A color filter in accordance with the present disclosure.

FIGS. 7A and 7B illustrate a further example of a digital display system 500 having an involute color filter 450 disposed between the integrator rod 240 (discussed above with respect to FIGS. 5A and 5B) and the SLM 190. In other examples, the involute color filter 450 is used with the integrator rod 140 (FIG. 1). A plan view of an involute color filter 450 is illustrated in FIG. 7B as having an involute color structure that facilitates the transmission of light from a light source 110 to the SLM 190. As illustrated, the involute color filter 450 has an involute of a circle design comprised of ten equal segments alternating between segment 451 and segment 452. The involute color filter 450 is 80 mm in diameter D (as measured in either the y-axis and z-axis as defined above with respect to FIG. 1) with a 20 mm diameter (D1) center cutout 455 for attachment to a rotatable member. The involute color filter 450 may also have an edge exclusion 460 with timing marks 461. Each of the segments 451 and 452 is laid out as a spiral with each spiral abutting the adjacent spiral. Each spiral is defined by the following equations: $xi=a*(cos(t)+t*sin(t))$ and $yi=a*(sin(t)-t*cos(t))$ with "a" being a variable that can be adjusted based on the number of segments, the diameter of the color filter, and the diameter of the center cutout and "t" is the parametric equation parameter that can range from 0 to infinity. As such, the diameters of the color filter and the center cutout and the spiral could be different from the illustrated example.

The involute color filter 450 improves on Archimedean color filters as horizontal lines between colors are flatter on the projected image. This results in better color area ratios as the involute color filter 450 rotates because as each color passing through the involute color filter 450 sweeps across the light transmitting end 244 (FIG. 5A) of the integrator rod 240, the area ratio between colors is closer to a constant ratio than the area ratio between colors for a non-involute color filter (e.g., Archimedean color filters). The improved area ratio improves the efficiency of the recycling process as a more variable color area ratio will result in brightness fluctuations with time. By reducing the area ratio variability, any brightness fluctuations can be reduced with use of the involute color filter 450.

Figure 8A:
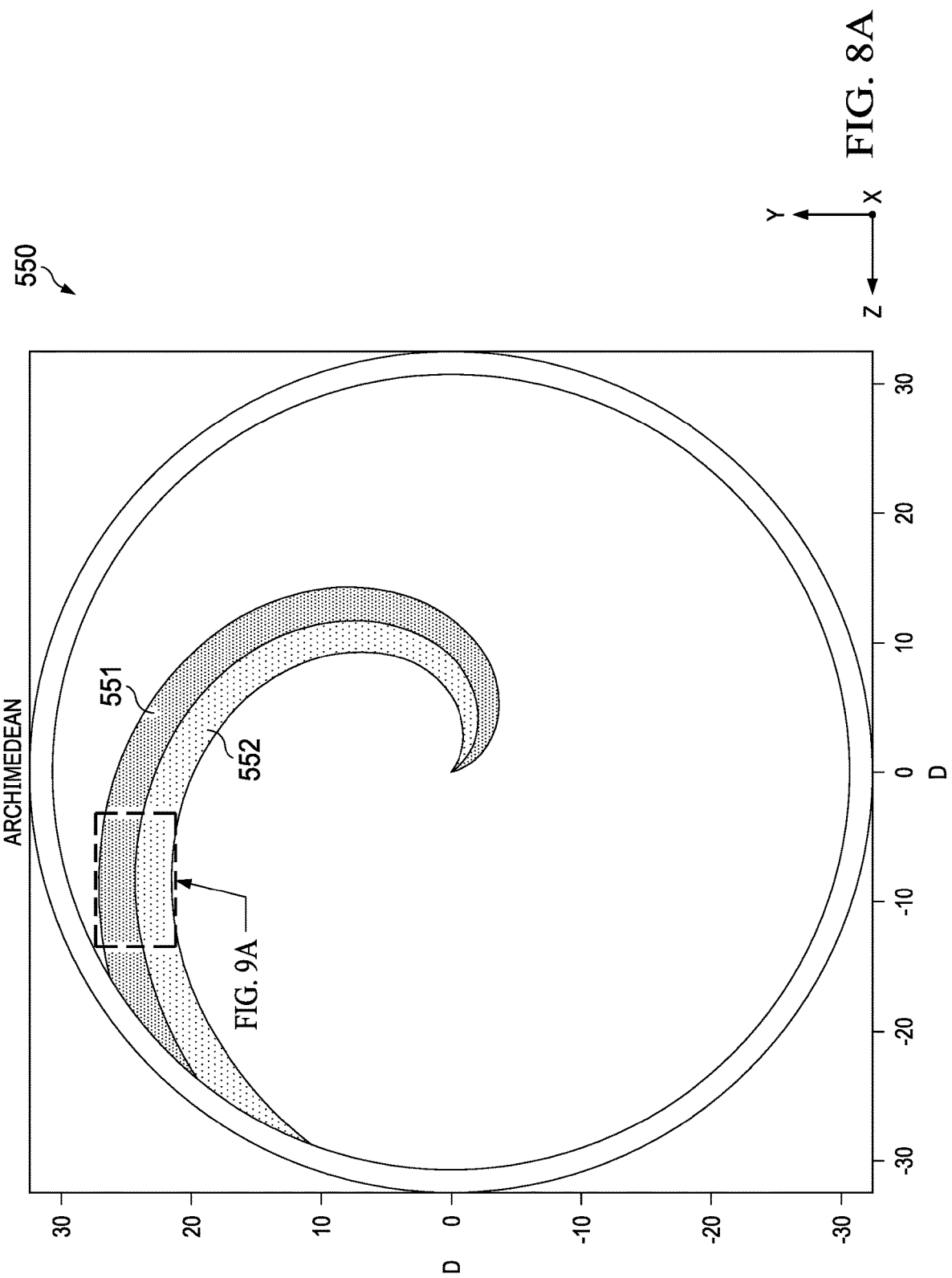
FIGS. 8A and 8B illustrate plan views of a section of two color filters that can be used in the systems of the present disclosure.
Figure 8B:
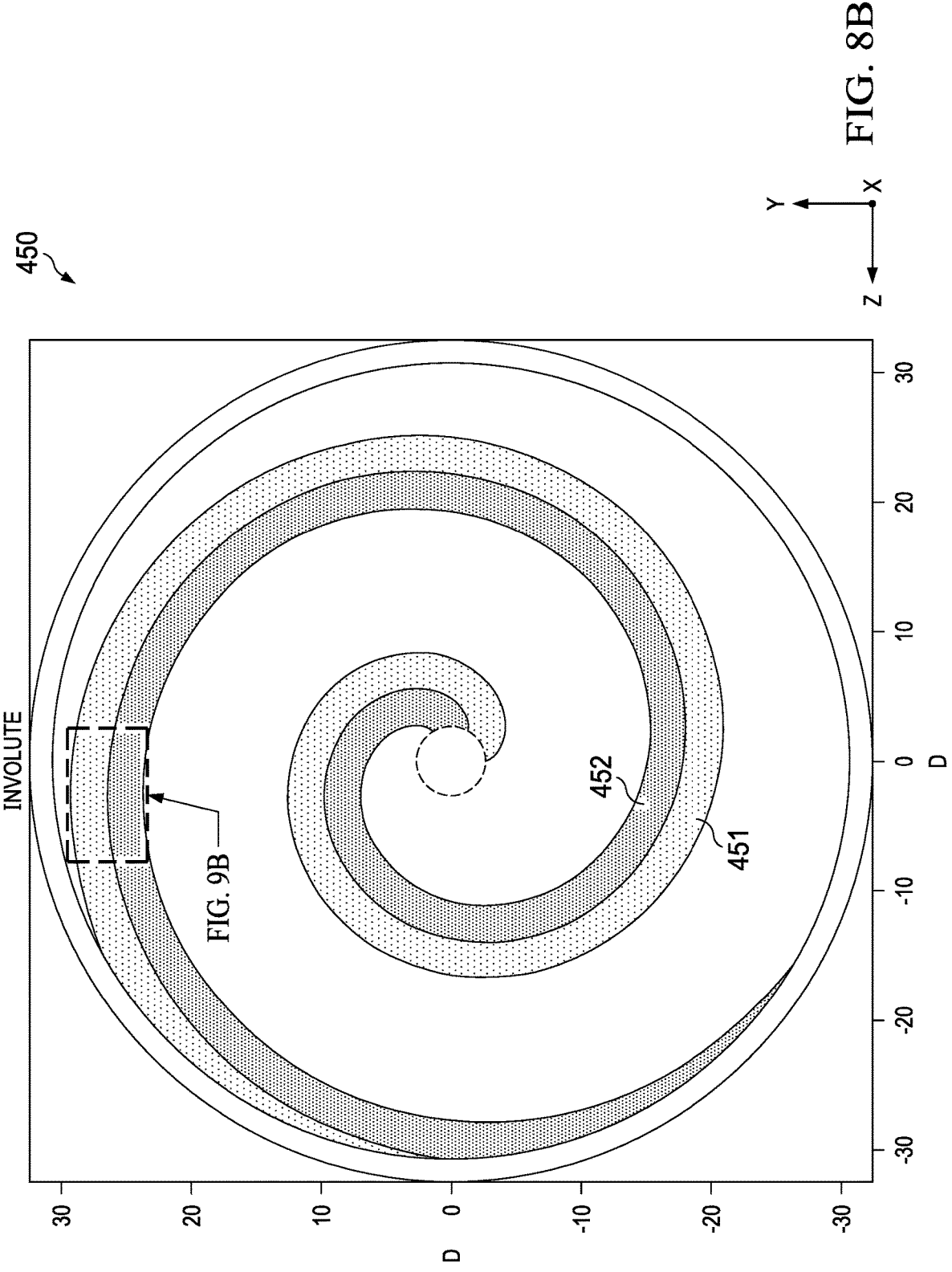

As shown in FIGS. 8A and 8B, partial segments of an Archimedean color filter 550 (FIG. 8A) having first and second segments (551 and 552, respectively) and an involute color filter 450 (FIG. 8B) having first and second segments (451 and 452, respectively) are illustrated side by side. As shown, the segments 551 and 552 of the Archimedean color filter 550 spiral once towards a center. As such, the segments 551 and 552 traverse the 0° mark only once. Involute color filter 450, on the other hand, has segments 451 and 452 that are spiral towards center cutout 455 at least twice, allowing each segment 451 and 452 to traverse the 0° mark three times. The involute color filter 450 thus allows the radius of curvature to increase. The higher the radius of curvature, the flatter the curve (which can be measured as curve height).

Figure 9A:
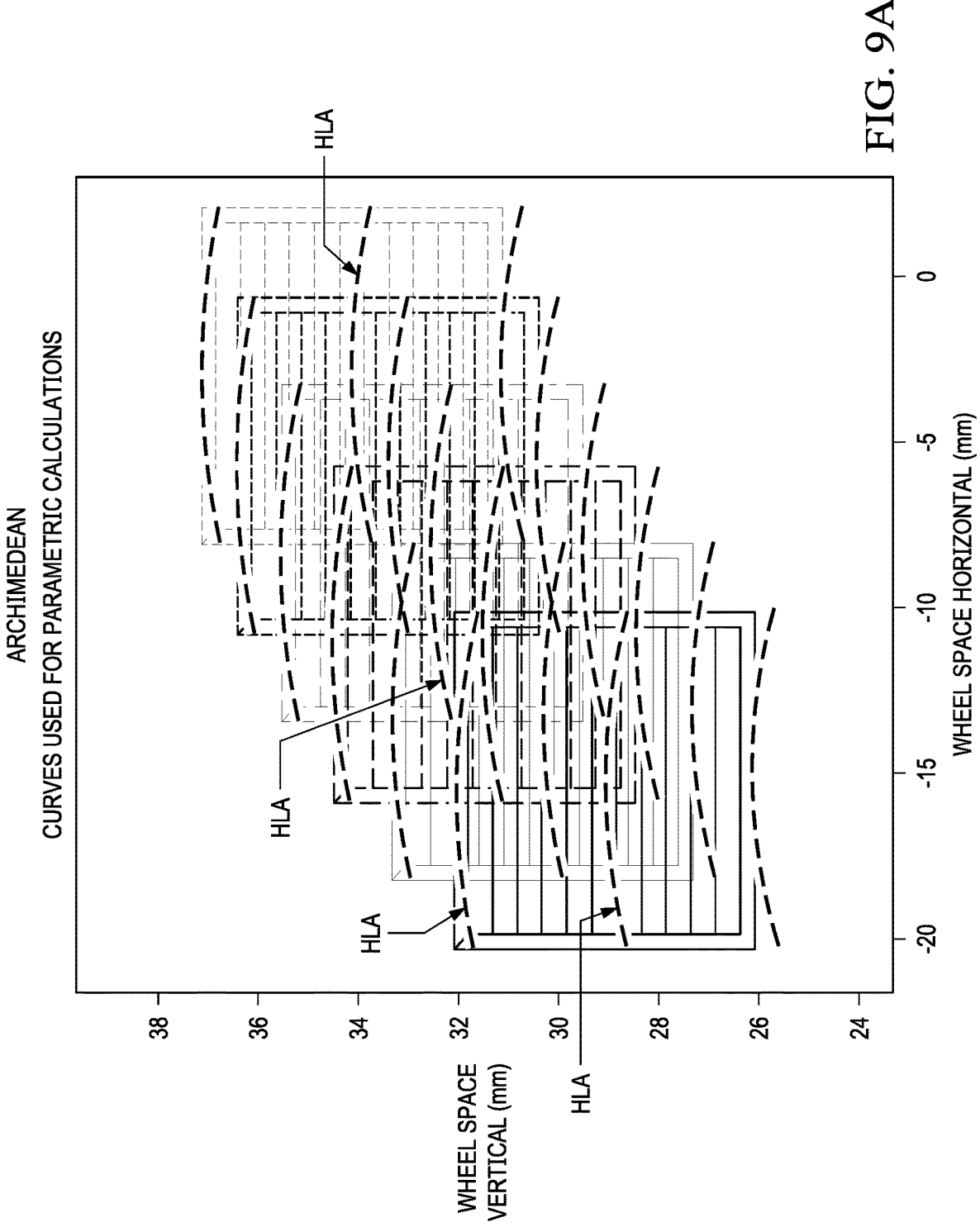
FIGS. 9A and 9B illustrate curved lines imaged by the color filters of FIGS. 8A and 8B, respectively.
Figure 9B:
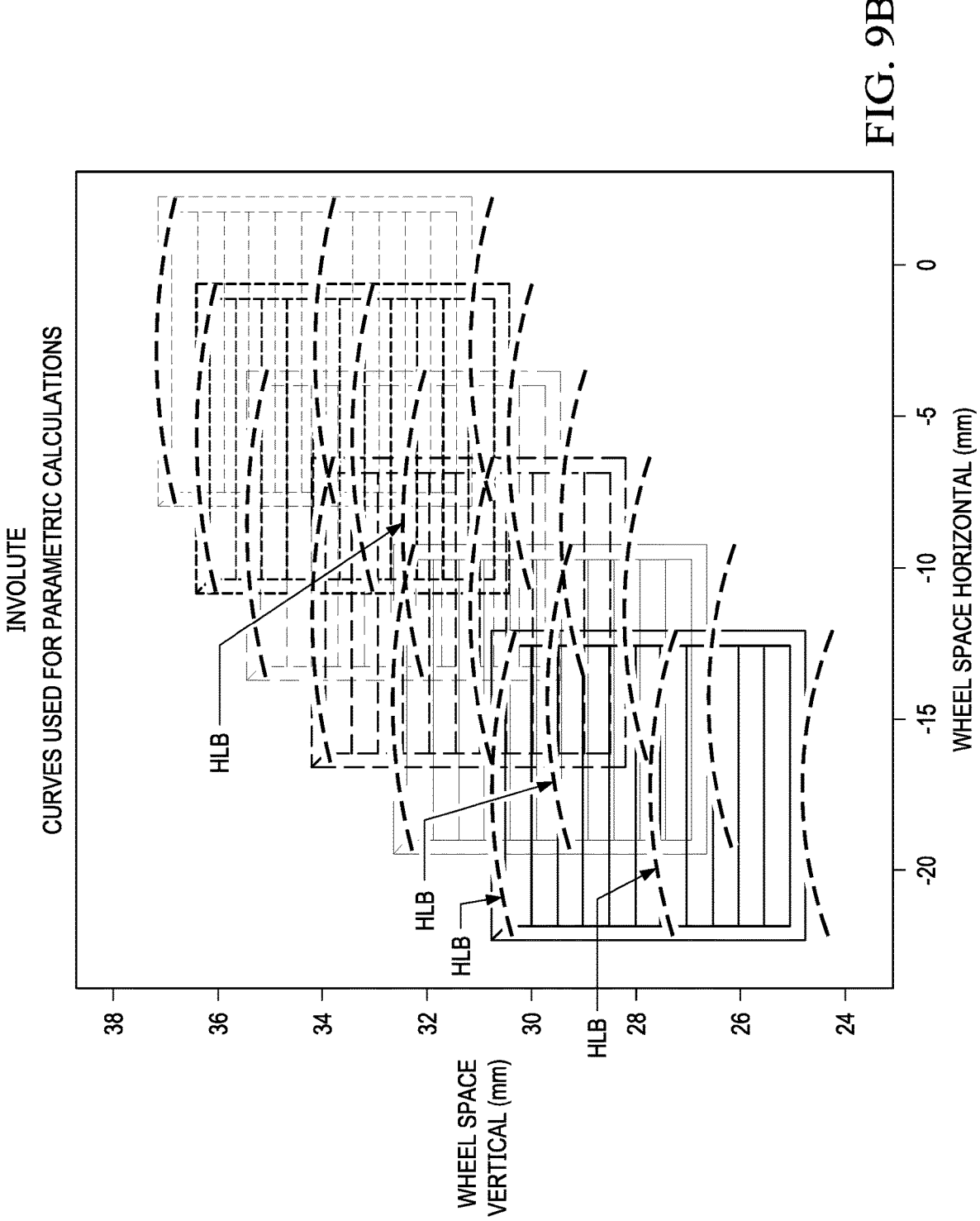

FIGS. 9A and 9B show curved lines HLA imaged from the Archimedean color filter 550 (FIG. 9A) and curved lines HLB imaged from an involute color filter 450 (FIG. 9B) onto SLM having horizontal lines representing reset blocks for different values of parameter "a." As shown, the radius of curvature of curved lines HLA imaged from the Archimedean color filter 550 (FIG. 9A) are smaller than that of the curved lines HLB imaged from an involute color filter 450 (FIG. 9B). As a result, the curves lines HLA imaged from the Archimedean color filter 550 (FIG. 9A) have a curve greater than the curved lines HLB imaged from the involute color filter 450 (FIG. 9B). Put another way, the involute color filter 450 (FIG. 9B) results in a flatter (and therefore improved) curved lines HLB as compared with the curved lines of the Archimedean color filter 550 (FIG. 9A). As a result, as one segment of the Archimedean color filter 550 transitions to the next, there will be an uneven color area ratio between two colors. The involute color filter 450, on the other hand, has a smoother transition in that its color area ratio is more even than that of the Archimedean color filter 550. In addition, the inactivity time of the individual micromirrors in the DMD can be reduced. Because of the smoother transition between colors, fewer micromirrors in the DMD will need to be switched off thereby increasing brightness in the overall image. Similarly, the inactivity time of individual reflective elements in LCoS SLMs can be reduced. Because of the smoother transition between colors, fewer pixels in the LCoS will need to be switched off thereby increasing brightness in the overall image.

In addition, the geometry of the involute color filter 450 allows for the horizontal tangent of the spiral in at the light-transmitting end of the integrator rod to remain in a near center (FIG. 9B) location on the y-axis. The horizontal tangent of the Archimedean spiral drifts off center along the y-axis as the spiral is scanned vertically. The involute color filter 450 thereby also adds to the color area ratio error and increases the complexity of accounting for the spiral when loading the data that generates the image.

Figure 9C:
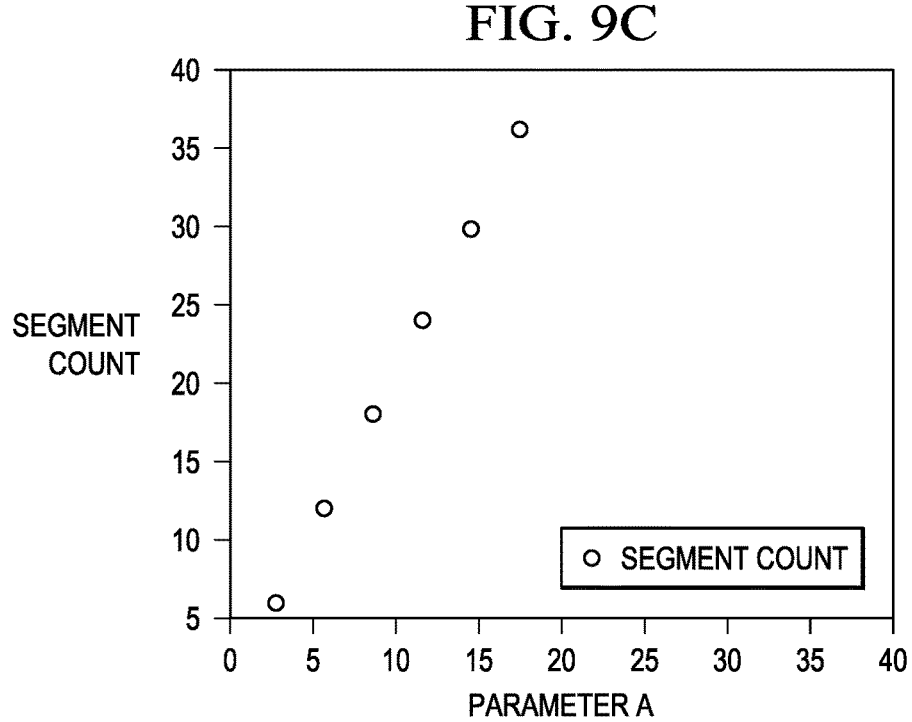
FIGS. 9C and 9D illustrate the impact of selecting the radius parameters of the FIG. 7B involute color filter.
Figure 9D:
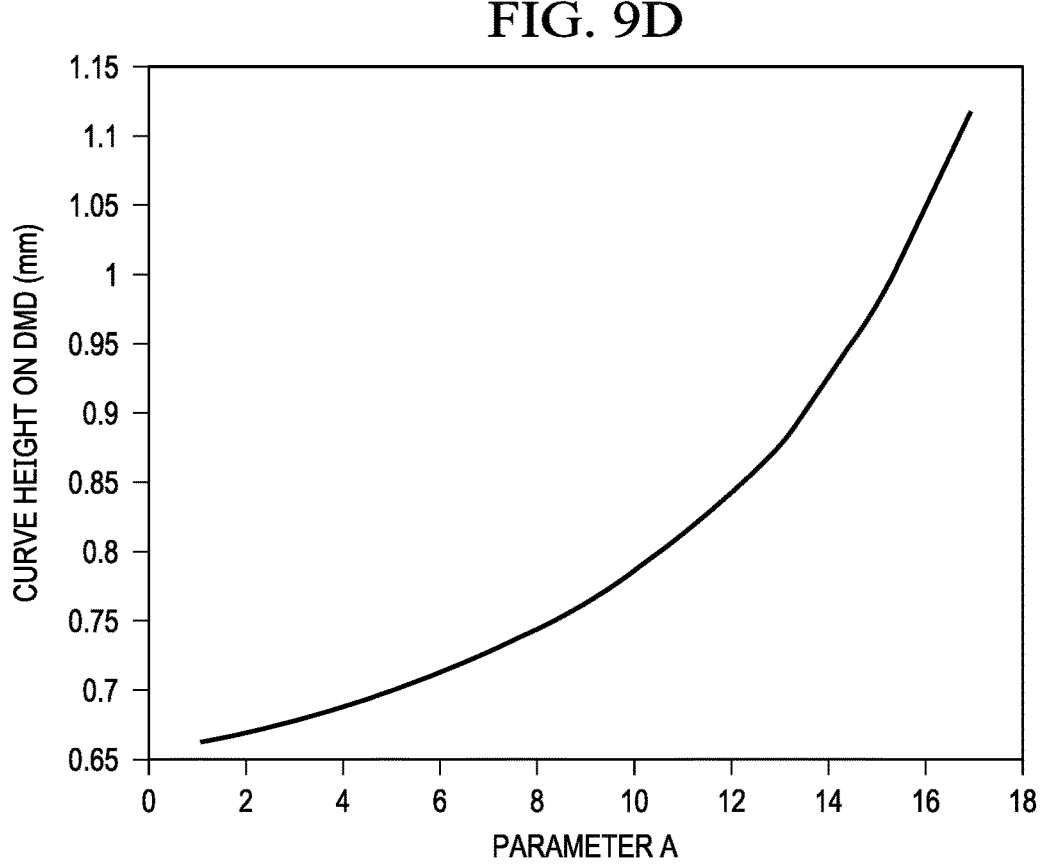

The number of segments, the diameter of the color filter and the diameter of the cutout are all variables to which the involute color filter would be considered in the implementation of the involute color filter. Generally, as shown in FIG. 9C, as the radius of parameter a (in equation: xi=a*(cos(t)+ t*sin(t)) and yi=a*(sin(t)−t*cos(t))) increases (shown along the x-axis of the graph), the number of segments also increases. As the number of segments increases, the less even the color area ratio will be due to the decreased radius of curvature of the horizontal lines HLB (FIG. 9B) and the greater the curve height of HLB (FIG. 9B), as shown graphically in FIG. 9D. The greater the curve height, the less even the color area ratio will be. The drawback to the lower number of segments, however, includes a lower frame rate. These variables are considered for each intended implementation of the examples disclosed herein. It should be noted that the involute color filter 450 can be implemented in any of the digital display systems described herein (e.g., 100, 200, 600, and 700).

Figure 10:
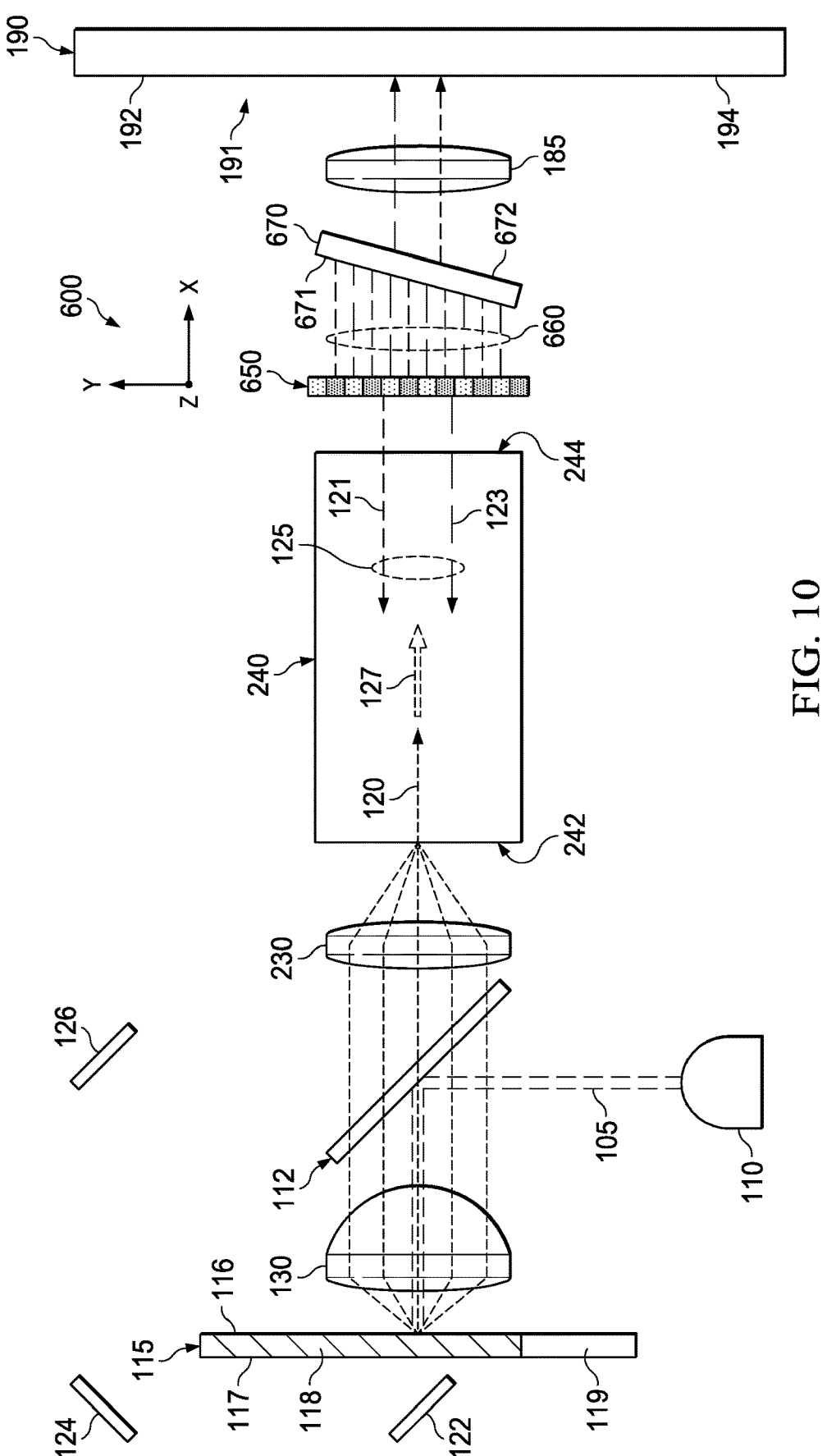
FIG. 10 illustrates a digital display system having a static color filter having a checkerboard pattern.

FIG. 10 illustrates a digital display system 600 incorporating a static color filter 650 and an actuator 670, which is rotatable about an x-axis, a y-axis, or both. Rather than have a color filter wheel that spins, e.g., color filter 150 (FIG. 1), the static color filter 650 remains fixed at or near the light transmitting end 244 of the integrator rod 240 (FIG. 5A) while the actuator 670 includes a piece of glass that can shift an entire or partial bundle of light to the display as disclosed in co-assigned U.S. Patent App. Pub. No. 2019/0227261, which is hereby incorporated herein by reference in its entirety. For example, the actuator could be a clear optical element that uses refraction across a width of the actuator 670 as defined by the distance between a first surface 671 and a second surface 672 opposite the first surface 671 of the actuator 670. The diffraction can shift an entire bundle of light 660 by a fraction of a pixel on the SLM. For example, the actuator can refract the bundle of light 660 by ¼ pixel in both the horizontal axis and the vertical axis. In this manner, the actuator 670 can be tilted down and to the left, up and left to, up and right, and down and right each by ¼ of pixel. Accordingly, one pixel in the SLM (not shown) can form four different images thereby increasing the resolution of a resulting image by 4×.

The FIG. 10 digital display system's operation is otherwise similar to the digital display system 100 described above with respect to FIGS. 1-4. As illustrated, blue light 105 is shown as a blue laser light and is directed vertically (i.e., along the y-axis and substantially perpendicular to the x-axis) towards the dichroic mirror 112 that is shown in FIG. 11 as having a 450 angle tilt (relative to the x-axis) causing blue light 105 to be directed towards the phosphor wheel 115 and along a path substantially parallel to the x-axis.

Phosphor wheel 115 includes a first face 116 that reflects light substantially parallel to the x-axis. Phosphor wheel 115 also includes a second face 117 that is substantially opposite of the first face 116. The first and second faces 116 and 117 extend along the y-axis in their height and extend along the z-axis in their width. When blue light 105 strikes the first segment 118 (FIG. 2), the blue light 105 is converted into yellow light 120 that is a blend of red and green light 121, 123, respectively. Yellow light 120 is reflected off the first segment 118 at one or more angles towards a first lens 130 proximate to the phosphor wheel 115. The first lens 130 collimates the incoming light and allows the light to pass to a second lens 230. The second lens 230 focuses the collimated light to a light receiving end 242 of the integrator rod 240, where it may be further homogenized or mixed. The light is allowed to pass through integrator rod 240 and to the light transmitting end 244 towards the SLM 190. The yellow light 120 travels through the integrator rod 240. As the yellow light 120 travels through the integrator rod 240, the yellow light 120 is reflected by the sides of the integrator rod 240 becoming homogenous. The color filter 650 has at least two segments (first and second segments 651 and 652, respectively) and is disposed between the integrator rod 240 and the SLM 190. Multiple rays of light for a large number of image pixels may be passed through actuator 670. By using refraction, different wavelengths can be directed to different portions of the SLM 190.

Figure 11:
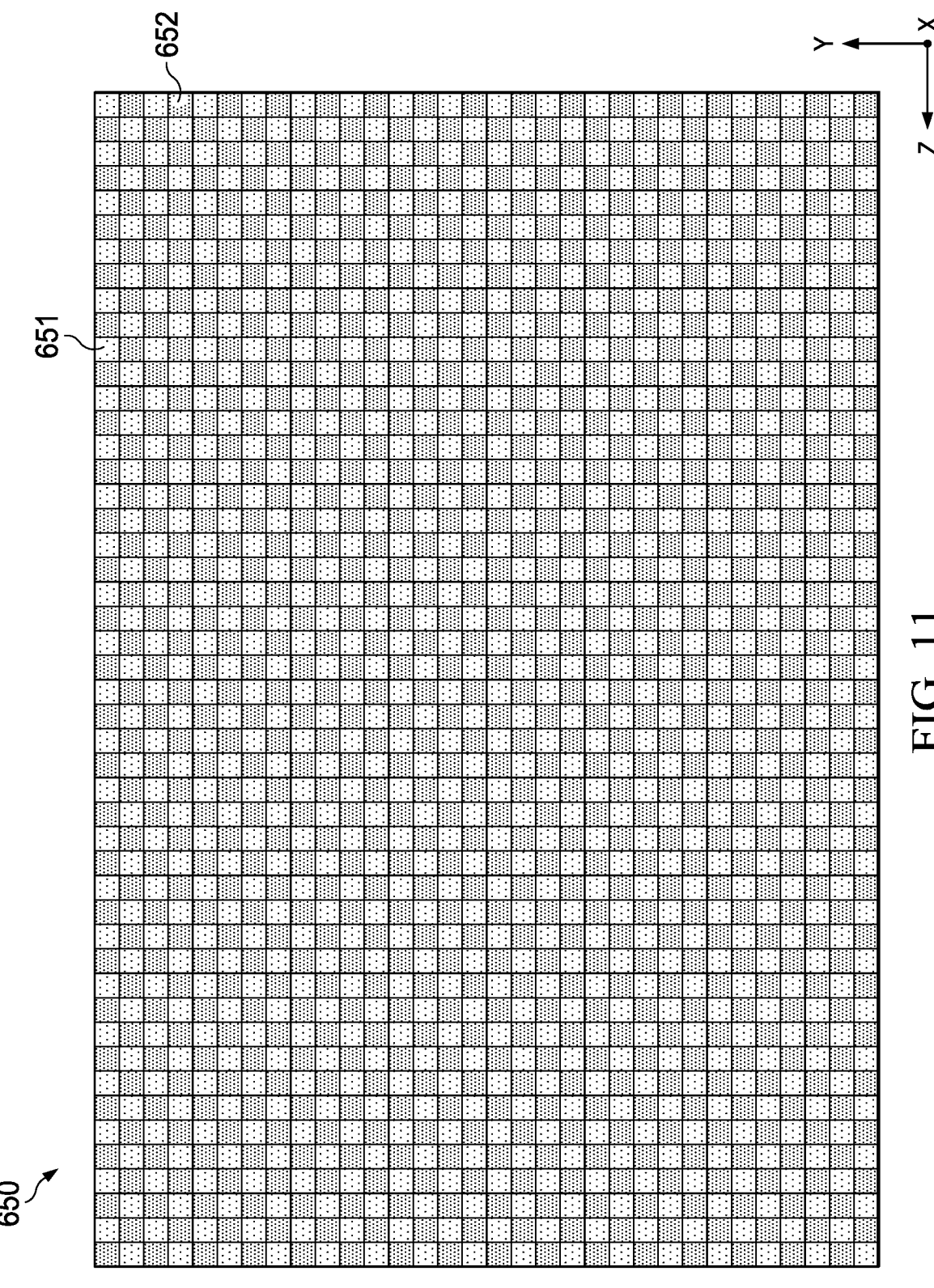
FIG. 11 illustrates a plan view of the FIG. 10 color filter.

FIG. 11 illustrates a plan view of the static (or non-rotating) color filter 650 having a checkerboard pattern. The color filter 650 can be used in any of the systems discussed and described herein (e.g., digital display system 100 (FIG. 1) or digital display system 200 (FIGS. 5A and 5B) and others), as could any of the other color filters described herein. The static color filter 650 remains fixed at or near the light transmitting end 244 of the integrator rod 240, and does not spin like color filter 150 (FIG. 1). As shown in FIG. 11, the static color filter 650 has an alternating pattern of magenta 651 and cyan 652 in a checkerboard fashion.

Referring back to FIG. 10, the path of a third wavelength of light that does not encounter the first segment 118 of the phosphor wheel 115 is similar to the path discussed above with respect to FIG. 4. Namely, blue light 105 (FIG. 4) is transmitted through second segment 119 of the otherwise reflective phosphor wheel and is transmitted and reflected off a series of mirrors 122, 124, and 126 and dichroic mirror 112. Mirrors 122, 124, 126, and dichroic mirror 112 reflect blue light 105 (FIG. 4) towards second lens 230, which focuses light towards the integrator rod 240. The blue light 105 is passed to the light receiving end 242 of the integrator rod 240. The light is allowed to pass through integrator rod 240 and to the light transmitting end 244 towards the SLM 190. As discussed above with respect to FIG. 4, blue light 105 includes blue light and passes through both cyan and magenta segments of color filter 650 (i.e., first and second segments 651 and 652, respectively) and onto the SLM 190. In alternating timeslots, blue light 105 or yellow light 120 impinge on the SLM 191 as discussed above.

Similar to the digital display system 200 discussed above with respect to FIGS. 5A-5B, as yellow light 120 encounters the color filter 650 of FIG. 10, some of the red and green light, 121 and 123, respectively, is reflected towards integrator rod 240 as reflected light 125. The reflected light 125 reflects from the internal face 260 (FIGS. 5A and 5B) towards the light transmitting end 244 as yellow light and redirected towards the color filter 650 as recycled yellow light 127. Like yellow light 120, recycled yellow light 127 encounters the color filter where red and green light (121 and 123, respectively) are transmitted towards the SLM 190. As recycled yellow light 127 encounters the color filter 150, some of the red and green light, 121 and 123, respectively, is reflected towards phosphor wheel 115 as reflected light 125, and the process begins anew until the reflected light has dissipated into the ambient. This recycling process improves the efficiency of the digital display system 600 and improves brightness of the image on the SLM 190.

Figure 12:
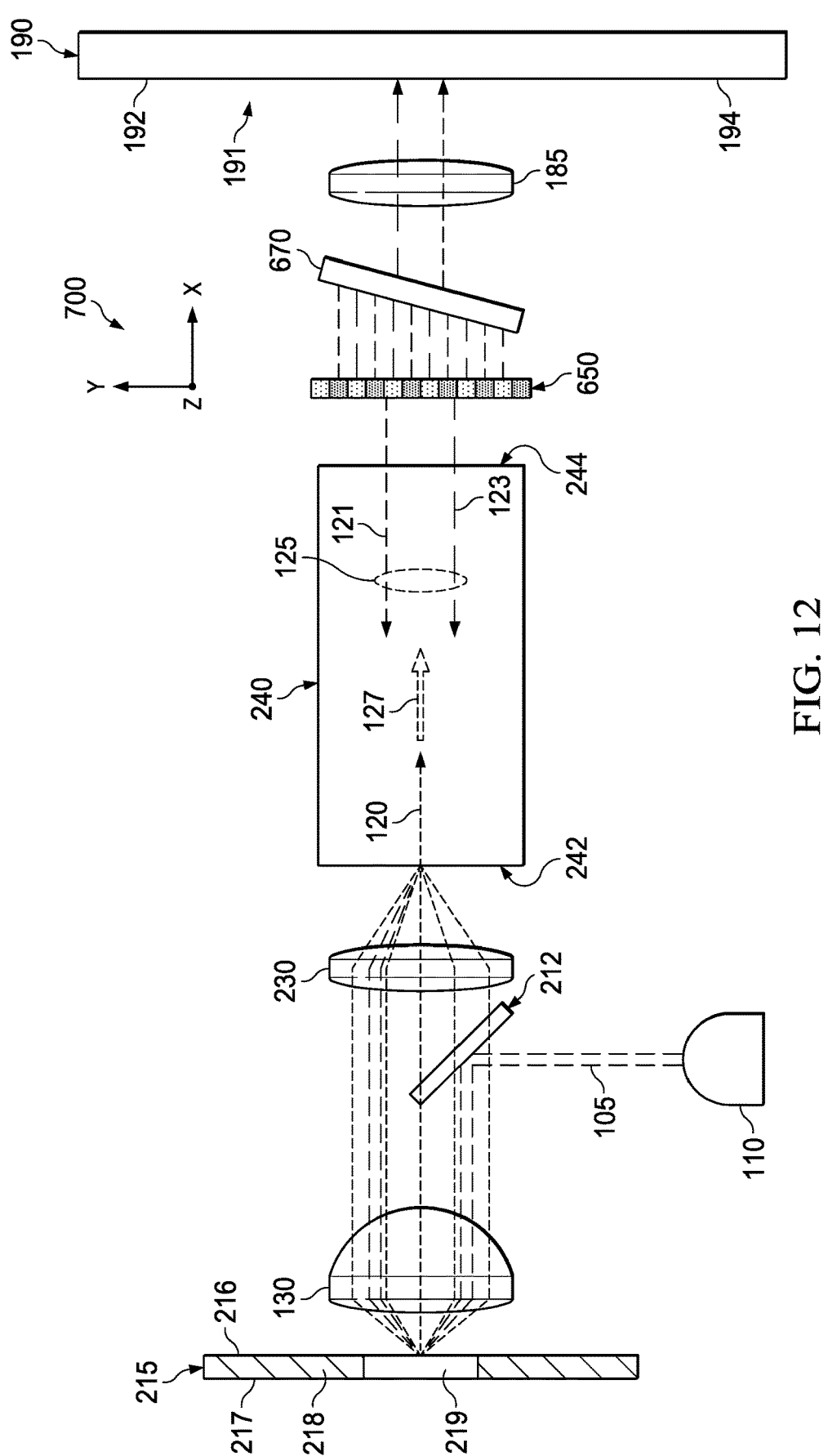
FIG. 12 illustrates a digital display system having a static color filter having a striped pattern.

FIG. 12 illustrates another example of a digital display system 700 in which the FIG. 11 color filter 650 can be included. In this example, a phosphor wheel 215 has first and second segments 218, 219 that include a reflective phosphor material and a reflective material, respectively. This implementation could eliminate the need for mirrors 122, 124, and 126 (e.g., FIG. 10) because the blue light 105 can be reflected directly towards the integrator rod 240 by the second segment 219 of the phosphor wheel 215 with the use of a second lens 230 that allows for focusing of yellow light 120 and blue light 105, because the dichroic mirror 212 is offset from center of the first lens 130. In addition, dichroic mirror 212 can be made of a smaller mirror (as compared with FIG. 1's dichroic mirror 112) such that blue light 105 reflected from the phosphor wheel 215 is reflected above the dichroic mirror from lens 130 to lens 230 without encountering dichroic mirror 212.

The FIG. 12 digital display system 700 operates similar to the examples discussed above with the exception of the blue light path shown in FIG. 4. Specifically, blue light 105 is shown as a blue laser light and is directed vertically (i.e., along the y-axis and substantially perpendicular to the x-axis) towards the dichroic mirror 212 that is shown in FIG. 12 as having a 450 angle tilt (relative to the x-axis) causing blue light 105 to be directed towards the phosphor wheel 215 and along a path substantially parallel to the x-axis. Phosphor wheel 215 includes a first segment 218 that has a reflective phosphor material. When blue light 105 strikes the first segment 218, the blue light 105 is converted into yellow light 120 that is a blend of green and red light 121, 123, respectively. The yellow light 120 is passed towards a first lens 130. The first lens 130 collimates the incoming light and allows the light to pass to a second lens 230. The second lens 230 focuses the collimated yellow light to a light receiving end 242 of the integrator rod 240, where it may be further homogenized or mixed. The light is allowed to pass through integrator rod 240 and to the light transmitting end 244 towards the SLM 190.

Phosphor wheel 215 also includes a second segment 219 that is substantially reflective. When blue light 105 strikes the second segment 219, blue light 105 is reflected towards the first lens 130 substantially along the x-axis. The first lens 130 collimates the incoming light and allows the light to pass to a second lens 230 and towards the light receiving end 242 of the integrator rod 240. The light is allowed to pass through integrator rod 240 and to the light transmitting end 244 towards the SLM 190.

The color filter 650 has at least two segments (first and second segments 651 and 652, respectively) and is disposed between the integrator rod 240 and the SLM 190. Multiple rays of light for a large number of image pixels may be passed through actuator 670. By using refraction, different wavelengths can be directed to different portions of the SLM 190.

Similar to the digital display system 600 discussed above with respect to FIG. 10, as yellow light 120 encounters the color filter 650 of FIG. 10, some of the red and green light, 121 and 123, respectively, is reflected towards the integrator rod 240 as reflected light 125. The reflected light 125 reflects from the internal face 260 (FIGS. 5A and 5B) towards the light transmitting end 244 as recycled yellow light 127 and redirected towards the color filter 650 as recycled yellow light 127. Like yellow light 120, recycled yellow light 127 encounters the color filter where red and green light (121 and 123, respectively) are transmitted towards the SLM 190. As recycled yellow light 127 encounters the color filter 650, some of the red and green light, 121 and 123, respectively, is reflected towards phosphor wheel 115 as reflected light 125, and the process begins anew until the reflected light has dissipated into the ambient. This recycling process improves the efficiency of the digital display system 700 and improves brightness of the image on the SLM 190.

Figure 13:
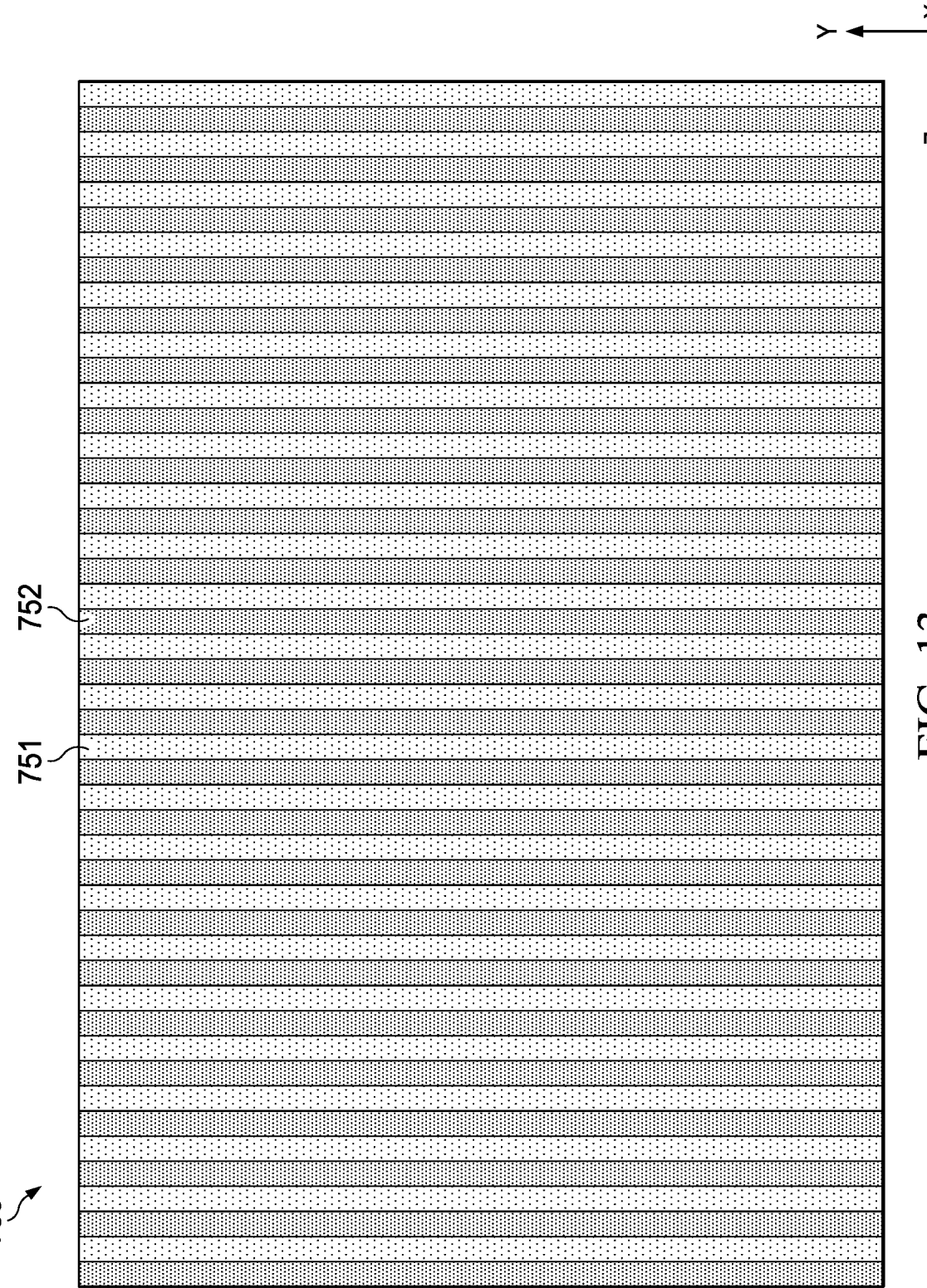
FIG. 13 illustrates a plan view of the FIG. 12 color filter having a striped pattern.

FIG. 13 illustrates a plan view of a different static color filter 750 having a striped pattern that can be used in any of the digital display systems discussed herein (e.g., 100, 200, 600, and 700). The operation of the striped static color filter 750 is similar to the operation of the checkered static filter 650 (FIG. 10) and can use an actuator 670 to similarly display different wavelengths of light to the SLM 190. As illustrated, the striped static color filter 750 includes alternating first and second segments 751, 752 capable of transmitting and reflecting first and second wavelengths of light. For example, as illustrated in FIG. 13, first segment 751 could be a magenta filter that transmits red and blue light 121 (FIG. 1) while reflecting green light 123 (FIG. 1) and second segment 752 could be a cyan filter that transmits green and blue light 123 (FIG. 1) while reflecting red light 121 (FIG. 1). As discussed above with respect to the digital display systems 100, 200, 500, 600, and 700, the yellow light 120 and the recycled yellow light 127 are passed through the static color filter thereby improving brightness of the overall digital display systems 100, 200, 600 and, 700. It should be noted that the example of FIG. 12 can be used with a third segment capable of transmitting a third wavelength.

Figure 14:
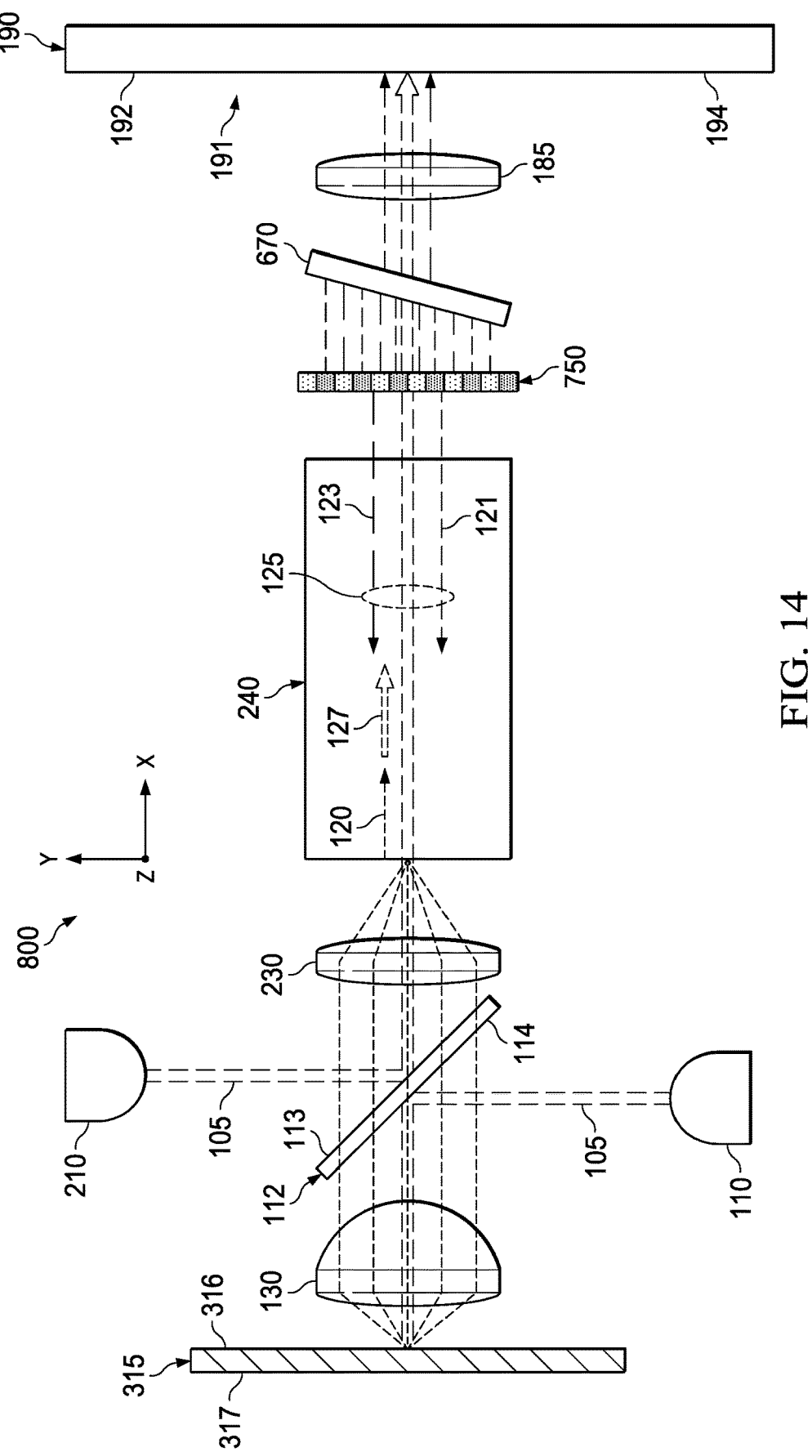
FIG. 14 illustrates another example of a digital display system incorporating the FIG. 13 color filter.

FIG. 14 illustrates an alternative example in which a digital display system 800 has two light sources 210 and 110 that are blue laser diodes capable of emitting blue light 105. The two light sources 210 and 110 can be implemented in other embodiments discussed herein. As illustrated in FIG. 12, dichroic mirror 112 has first and second surfaces 113, 114. A first light source 110 is situated such that blue light is directed vertically (i.e., substantially perpendicular to the x-axis) towards the first surface 113 that is shown in FIG. 14 as having a 450 angle tilt (relative to the x-axis) causing blue light 105 to be directed towards a phosphor member 315 and along a path substantially parallel to the x-axis. A phosphor member 315 includes a first face 316 that converts the blue light 105 to yellow light 125 and reflects the yellow light 125 substantially parallel to the x-axis and a second face 317 that is substantially opposite of the first face 316. The yellow light 125 passes through first lens 130, dichroic mirror 112, and second lens 230 to integrator rod 240. The second blue light diode 210 is situated over the dichroic mirror 112 and reflects off the second surface 113 of mirror 112 having a 450 tilt towards the integrator rod 240 and to the SLM 190. Unlike the phosphor wheel 115 of FIG. 1, the phosphor member 315 of digital display system 300 consists of a solid piece of phosphor material. This architecture can eliminate any mechanics necessary for the rotation of the phosphor wheel 115 of FIG. 1, and therefore be a static or non-rotating component. The architecture also eliminates the need for a series of mirrors 122, 124, and 126 (FIG. 4). In addition, because the first and second segments 751, 752 of color filter 750 transmit blue light 105, the digital display system 800 can transmit at least three wavelengths of light (e.g., red, green and blue) to the SLM 190 by simultaneously having both light sources 110 directing blue light 105 towards the mirror 112 at the same time. In addition, if color filter 750 is replaced with color filter 350 (FIGS. 6A and 6B), which transmits yellow light 120 in addition to red light 121, green light 123, and blue light 105, the FIG. 14 digital display system 800 can transmit at least four different wavelengths of light simultaneously.

The operation of digital display system 800 is otherwise similar to the FIG. 5A digital display system 200. For example, when blue light 105 strikes phosphor material, the blue light 105 is converted into yellow light 120 and reflected towards first and second lenses 130, 230. Yellow light 120 is focused and transmitted towards and through a recycling integrator rod 240 along the x-axis and towards the SLM 190. As discussed above with respect to digital display system 200, certain wavelengths of the yellow light 120 pass through the color filter (color filter 750 of FIG. 12) while certain wavelengths are reflected back towards the internal surfaces of the recycling integrator rod 240. The reflected light 125 is recycled by the recycling integrator rod 240, and the recycled yellow light 127 is passed through the static color filter thereby improving brightness of the overall digital display system 800.

Figure 15:
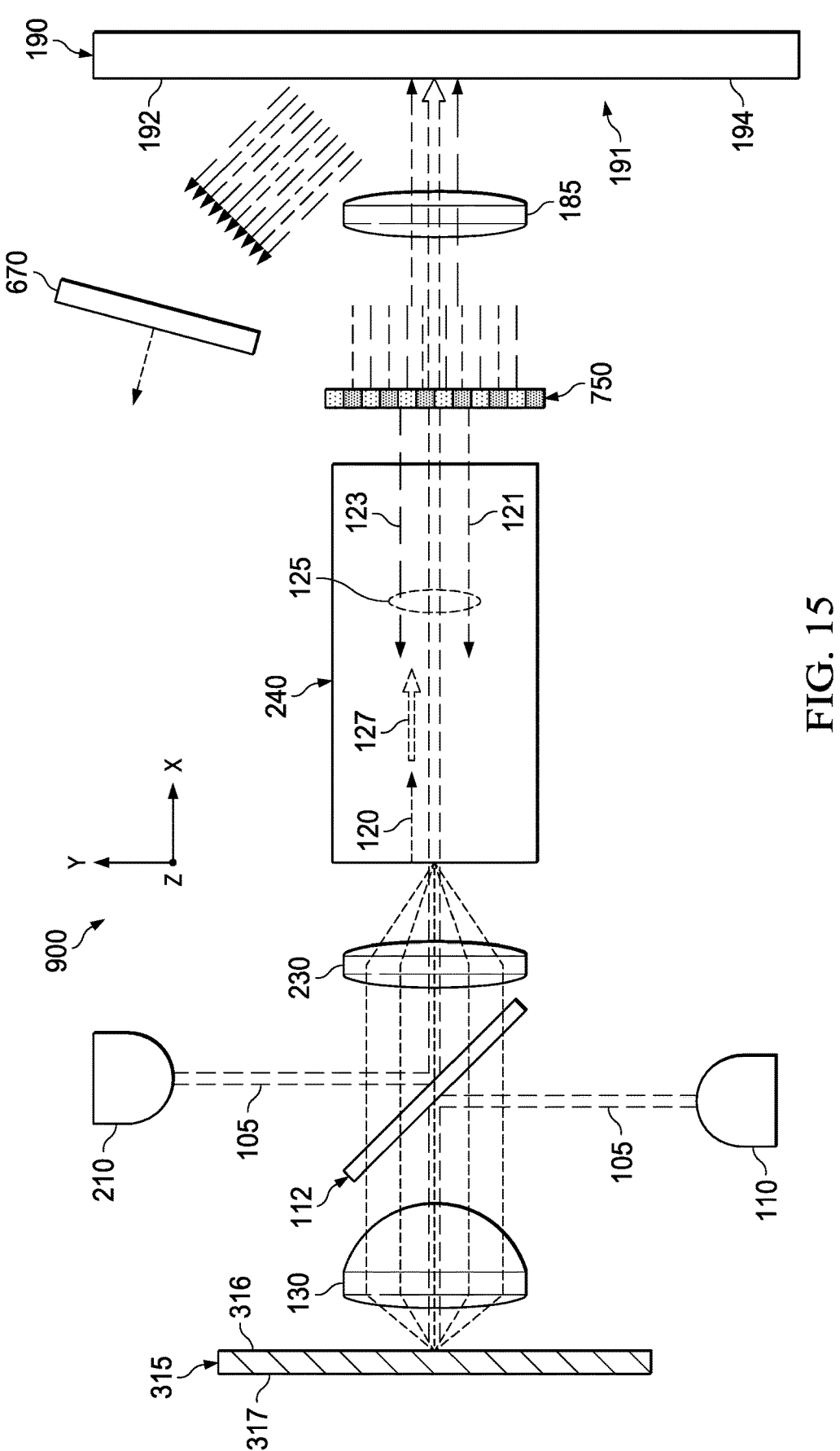
FIG. 15 illustrates another example of a digital display system in accordance with the present disclosure having an actuator in a path of light reflected from a spatial light modulator.

FIG. 15's digital display system 900 includes an actuator 670 placed in the path of light after reflecting off SLM 190 (e.g., DMD or LCoS). In this example, the SLM 190 surface projects two display images that are created from the incoming image frames and are split into sub-frames for each one of the displayed high-resolution image frames. After displaying a first sub-frame for a portion of a frame image time, the actuator 670 positioned in the projection path shifts the position of the SLM frames by an amount (e.g., a pixel or less than a pixel distance, for example by half a pixel) in the horizontal direction, and a second sub frame is displayed for a second portion of a frame time. In addition, sub-frames can be shifted in the vertical direction as well, for example by half a pixel. By shifting back and forth, the image resolution in the image observed by the viewer is increased over the number of physical mirrors by, for example, a factor of 2. In this manner a smaller resolution SLM (for example, ½ the number of mirrors) can be used to produce an image with a visual resolution that appears greater than the resolution obtained simply from the number of elements in the SLM.

For example, with respect to color filter 750 (FIG. 15), a first image time can image red and green; a second image time can optically shift the image by 1 pixel horizontally, and place red on top of green and green on top of red. A third image time can optically shift the image by ½ pixel (or 0.5 pixel) both horizontally and vertically. A fourth image time can optically shift the image by 1.5 pixels horizontally and vertically. The third and fourth image times and shifts would provide two-way optical super resolution. For blue, the image times can be divided into two and the first and second image times would have blue imaged without a shift and the third and fourth image times would have a 0.5 pixel shift both horizontally and vertically. This optical shifting improves the resolution of the image.

While color filters 650 and 750 are discussed and described as having checkerboard and vertical stripe configurations, other implementations could include horizontal stripe configurations and/or differently shaped alternating patterns. For example, while FIG. 10's color filter 650 is illustrated as a checkerboard pattern having square segments 651 and 652, it should be recognized that the squares could be halved at a 450 angle into triangles and each triangle could represent a segment. Other shapes and patterns can be included based on the intended operation of the digital display system. While digital display system 900 is illustrated as having two light-emitting diodes 110 and 210, it should be noted that the digital display system 900 could be implemented with one light emitting diode.

Figure 16:
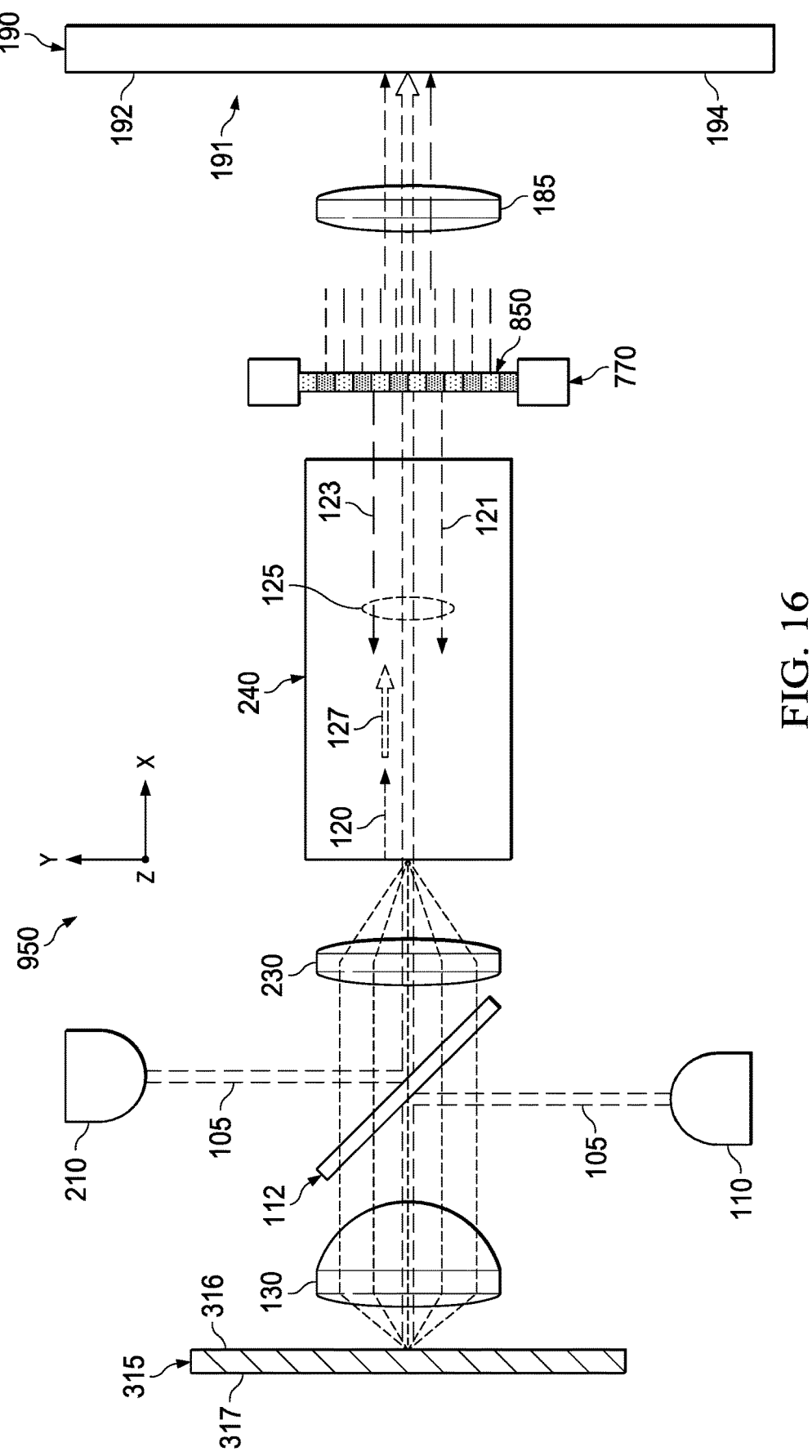
FIG. 16 illustrates another example of a digital display system in accordance with the present disclosure having two light sources.

In another embodiment, a checkerboard or striped color filter could be coupled to an actuator. For example, FIG. 16 shows an actuated color filter 850 directly attached to a translational actuator 770. The translational actuator shifts the actuated color filter 850 filter slightly (e.g., less than a pixel) in both y and z directions (in the case of a checkerboard pattern (e.g., FIG. 11)) or just in the y direction or just in the z direction (in the case of a striped pattern (e.g., FIG. 13)). Other mechanisms by which the actuated color filter 850 and the actuator 770 are coupled are intended to be within the scope of the present disclosure. In operation of the digital display system 950, the actuator 770 translates appropriately in the plane of the y- and z-axes to move filter 650 and direct red 121, green 123, and blue light 105 to the SLM 190.

The operation of digital display system 950 is otherwise similar to the FIG. 14 digital display system 800. For example, when blue light 105 strikes phosphor material, the blue light 105 is converted into yellow light 120 and reflected towards first and second lenses 130, 230. Yellow light 120 is focused and transmitted towards and through a recycling integrator rod 240 along the x-axis and towards the SLM 190. As discussed above with respect to digital display system 200, certain wavelengths of the yellow light 120 pass through the color filter (color filter 850) while certain wavelengths are reflected back towards the internal surfaces of the recycling integrator rod 240. The reflected light 125 is recycled by the recycling integrator rod 240, and the recycled yellow light 127 is passed through the static color filter thereby improving brightness of the overall digital display system 950.

Figure 17:
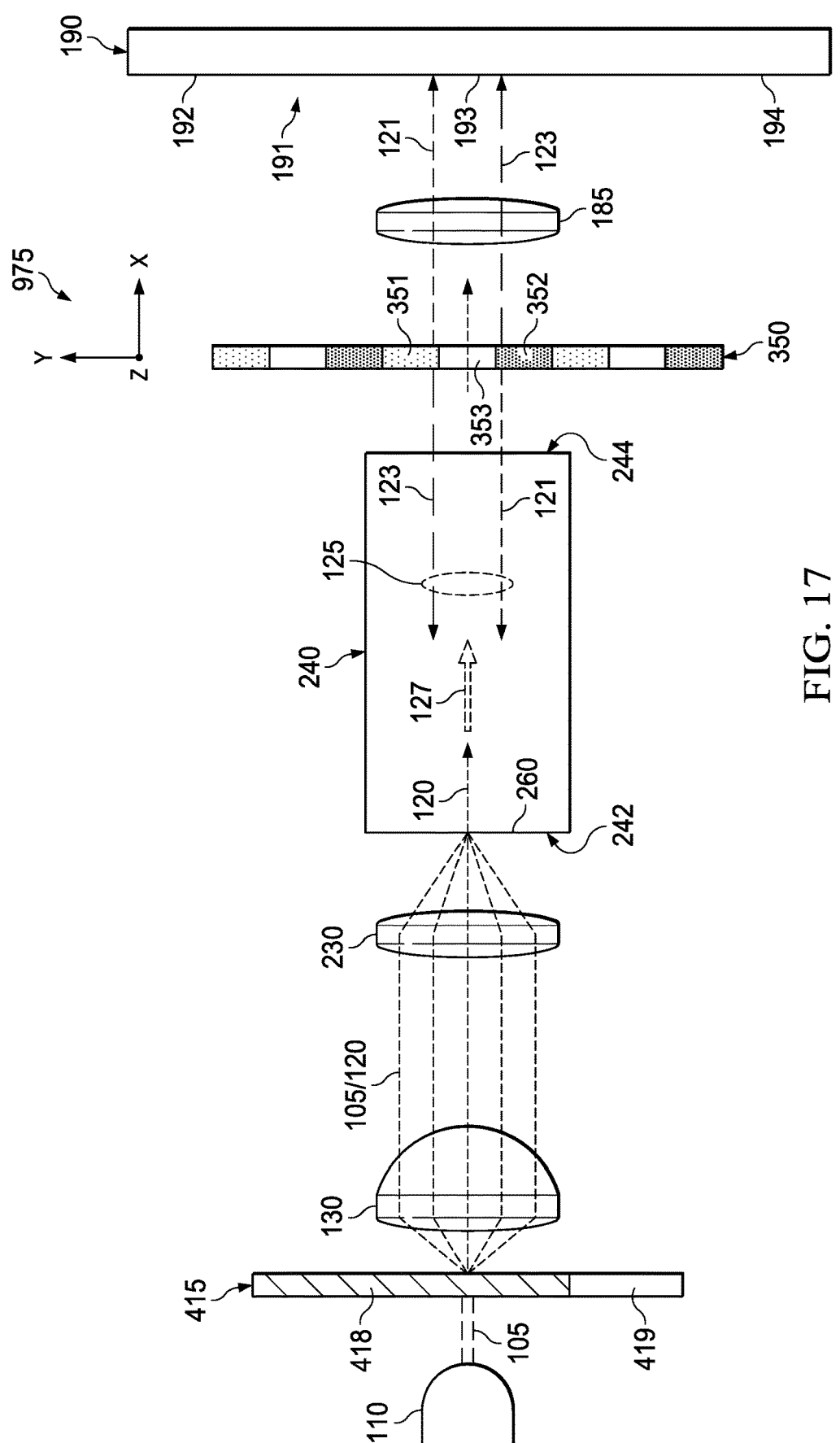
FIG. 17 illustrates another example of a digital display system in accordance with the present disclosure.

FIG. 17 illustrates another example of a digital display system 975 having a light source 110 having a substantially straight pathway along the x-axis towards a SLM 190. Digital display system 975 does not use the dichroic mirrors 112 of digital display system 100 (FIG. 1) and directs light towards the SLM 190 through phosphor wheel 415, first lens 130, second lens 230, integrator rod 240, color filter 350, and relay optics 185 to be imaged on SLM 190. Blue light 105 from the light source 110 is directed to a phosphor wheel 415 that has first and second segments (418 and 419). When the first segment 418 having phosphor is in the path of light 105, it is converted into yellow light 120. This yellow light 120 is directed towards and through the integrator rod 240, which is further directed towards color filter 350 and out to the SLM 190 through relay optics 185.

Like digital display systems 100, 200, 400, 600, 800, 900, and 950, reflected light 125 can be recycled to improve the efficiency of the digital display system 950 and improve the brightness on the SLM. As yellow light 120 encounters the color filter 350, some of the red and green light, 121 and 123, respectively, is reflected towards the integrator rod 240 as reflected light 125. The reflected light 125 reflects from the internal face 260 (FIGS. 5A and 5B) towards the light transmitting end 244 as yellow light 127 and redirected towards the color filter 350 as recycled yellow light 127. Like yellow light 120, recycled yellow light 127 encounters the color filter where red and green light (121 and 123, respectively) are transmitted towards the SLM 190. As recycled yellow light 127 encounters the color filter 150, some of the red and green light, 121 and 123, respectively, is reflected towards phosphor wheel 415 as reflected light 125, and the process begins anew until the reflected light has dissipated into the ambient.

Figure 18:
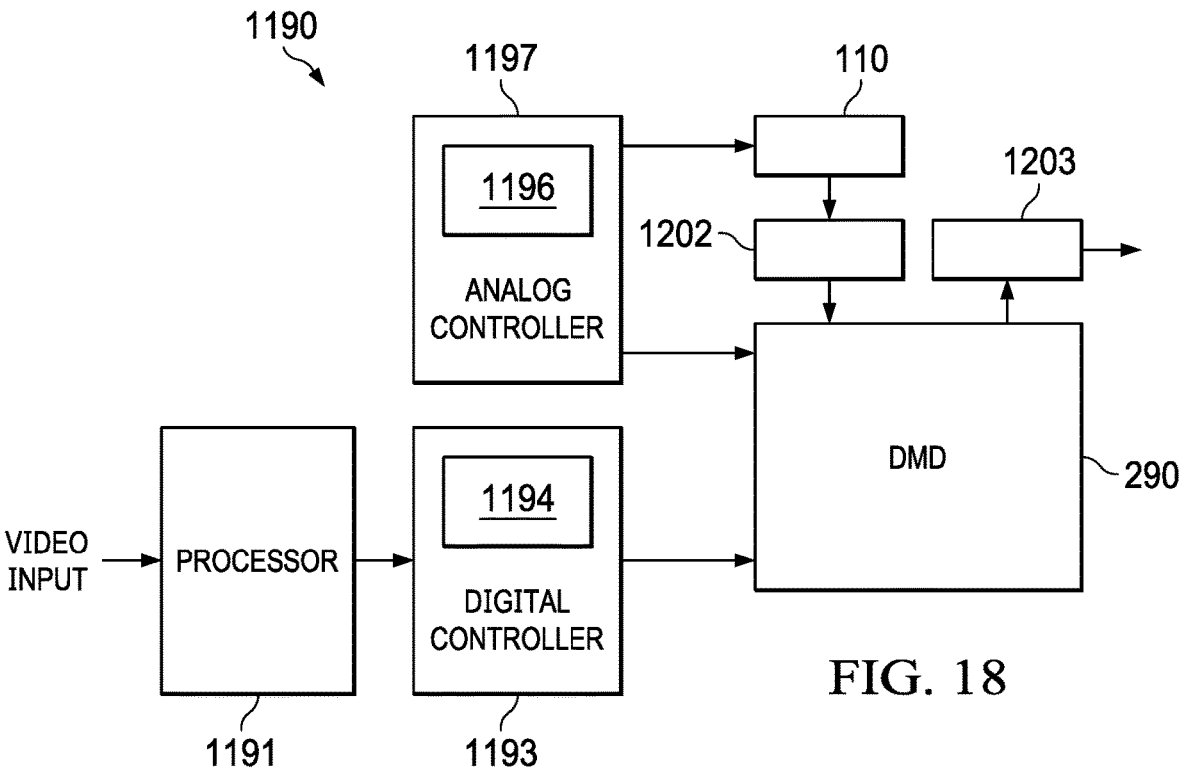
FIG. 18 illustrates a block diagram of a digital display system in accordance with the present disclosure.

FIG. 18 shows an example of a circuit 1190 for use with any one of the digital display systems described above and combinations thereof. A processor 1191, for example a microprocessor, mixed signal processor, digital signal processor, microcontroller or other programmable device, is provided, and executes instructions that cause it to output digital video signals for display. A variety of sources may provide the digital video signals labeled video input in the figure, including internet browsers, stored files in video cards, flash cards, Universal Serial Bus (USB) drives and the like, High-Definition Multimedia Interface (HDMI) or other inputs, cameras, and camcorders, etc. The processor 1191 is coupled to a digital controller 1193 which is another digital video processing integrated circuit. An analog controller 1197 is also provided. The analog controller 1197 controls the intensity and power to the light source 110. The digital controller 1193 operates the SLM 290, for example by toggling the micromirrors in the on or off state. The analog controller 1197 also provides power and analog signals to the SLM 190. The light rays from the illumination sources 110 are input to the illumination components 1202 such as the first and second lenses 130, 230 (FIG. 1), integrator rod 140 and 240 (FIGS. 1 and 5A, respectively), and color filters 150 (FIG. 1) 350 (FIG. 6A), 450 (FIG. 7), 650 (FIG. 10), and/or 750 (FIG. 13). The light rays strike the SLM 190 and reflect light to projection optics 1203 for further processing for projection on a screen (not shown). Together the integrated circuits 1193, 1197 cause the SLM 190 and the optical components to operate to project the digital video signals as an image.

The integrated circuits 1193, 1197 may include a general-purpose microprocessor, digital signal processor, microcontroller, or other device capable of executing instructions retrieved from a computer-readable storage medium. Processor architectures generally include execution units (such as: fixed point, floating point, integer, or other execution units), storage (such as registers or memory), instruction decoding, peripherals (such as interrupt controllers, timers, and/or direct memory access controllers), input/output systems (such as serial ports, parallel ports, etc.) and various other components and sub-systems. The integrated circuits 1193, 1197 can include storage 1194, 1196 as non-transitory computer-readable storage medium suitable for storing executable instructions. The storage 1194, 1196 may include volatile storage such as random-access memory, non-volatile storage (such as a hard drive, an optical storage device (for example a compact disc (CD) or digital versatile disc (DVD) drive), flash storage, read-only-memory), or combinations thereof.

FIG. 19 illustrates an example of a process 1600 by which digital display system 200, for example, operates. At 802, blue light is directed towards a phosphor wheel, for example phosphor wheel 115. At 804, if the first segment is positioned in the path of blue light, the blue light is converted to yellow light and directed toward the integrator rod. At 806, if the second segment is positioned in the path of blue light, blue light is directed toward and transmitted through the recycling integrator rod. Both yellow light and blue light pass through the integrator rod at 808. At 810, yellow light encounters first segment, which allows a first wavelength to pass 812 and reflects a second wavelength 814. At 811, yellow light encounters second segment, which allows a second wavelength to pass 812 and reflects a first wavelength 814. At 808, any reflected light is recycled as yellow light and directed towards the first and second segments of the color filter. The blue light encountering either first or second segments is allowed to pass 812. The light that passes first and second segments of the color filter are imaged on the SLM 190 (e.g., FIG. 1) at 816. The process of 808, 810, 811, and 814 can be repeated until all reflected light has either been transmitted 812 to the SLM at step 816 or has dissipated or otherwise escaped the system. The light that passes first and second segments of the color filter are imaged on the SLM.

The above discussion is meant to be illustrative of principles and various examples consistent with the disclosure. Numerous variations and modifications can be made. For example, while the cross-sectional dimensions of the various components (e.g., color filters, phosphor wheels/members, integrator rods etc.) have been illustrated relative to one another, other implementations could include different relative dimensions. In addition, other implementations could include different components in the systems described above. For example, and as discussed above, integrator rod 140 could be used in any of the above-described digital display systems (100, 200, 400, 500, 600, 800, 900, 950 and 975) as could recycling integrator rod 240 (FIG. 5A). In addition, the examples above having two light sources 110 (e.g., FIG. 14) and either a stationary or rotating phosphor member 315 (e.g., FIG. 14), 215 (e.g., FIG. 12) or wheel 115 (e.g., FIG. 1) could be implemented in any of the above-described digital display systems (e.g., 100, 200, 400, 500, 600, 700, 800, 900, 950 and 975). Similarly, any of the above-described color filters (e.g., 150, 350, 450, 550, 650, 750) could be implemented in any of the above-described digital display systems (e.g., 100, 200, 400, 500, 600, 700, 800, 900, 950 and 975). Accordingly, it is intended that the following claims be interpreted to embrace all such variations and modifications.

In addition, certain terms have been used throughout this description and claims to refer to particular system components. As can be appreciated, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to."

What is claimed is:

1. A system comprising:
a color filter comprising:
a first segment configured to transmit first light having a first color and to reflect second light having a second color; and
a second segment configured to transmit the second light having the second color and to reflect the first light having the first color; and
an integrator rod optically coupled to the color filter, the integrator rod including a first end and a second end that is closer to the color filter than the first end, the integrator rod including a reflective surface at the first end, the reflective surface having an aperture.

2. The system of claim 1, wherein the second end is disposed facing the color filter.

3. The system of claim 1, wherein the aperture is round.

4. The system of claim 1, further comprising a phosphor wheel optically coupled to the integrator rod, the phosphor wheel having a first side and a second side.

5. The system of claim 4, further comprising:
a dichroic mirror having a first side and a second side, the second side of the dichroic mirror optically coupled to the integrator rod and the first side of the dichroic mirror optically coupled to the first side of the phosphor wheel;
a light source optically coupled to the first side of the dichroic mirror; and
a series of mirrors optically coupling the second side of the phosphor wheel to the second side of the dichroic mirror.

6. A system comprising:
a light source configured to produce first light having a first color and second light having a second color;
a color filter optically coupled to the light source, the color filter having:
a first segment configured to transmit the first light having the first color and to reflect the second light having the second color to produce first reflected light; and
a second segment configured to transmit the second light having the second color and to reflect the first light having the first color to produce second reflected light; and
an integrator rod optically coupled between the light source and the color filter, the integrator rod configured to:
transmit the first light towards the color filter;
transmit the second light towards the color filter;

reflect the first reflected light to direct the first reflected light towards the color filter; and
reflect the second reflected light to direct the second reflected light towards the color filter;
wherein the color filter is one of an involute color filter and an Archimedean color filter.

7. The system of claim 6, wherein the first segment and the second segment are configured to transmit third light having a third color.

8. The system of claim 6, wherein the color filter comprises a third segment configured to transmit third light having a third color and to reflect the first light having the first color and the second light having the second color, wherein the first segment is configured to reflect the third light having the third color and the second segment is configured to reflect the third light having the third color.

9. The system of claim 6, wherein the color filter is the involute color filter.

10. The system of claim 6, wherein the color filter is the Archimedean color filter.

11. The system of claim 6, wherein the color filter is a static checkerboard color filter or static striped color filter.

12. The system of claim 6, further comprising a spatial light modulator (SLM) optically coupled to the color filter.

13. The system of claim 12, further comprising an actuator optically coupled to the spatial light modulator.

14. The system of claim 6, wherein the light source comprises a phosphor wheel optically coupled to the integrator rod.

15. A system comprising:
a color filter comprising:
a first segment configured to transmit first light having a first color and to reflect second light having a second color; and
a second segment configured to transmit the second light having the second color and to reflect the first light having the first color;
an integrator rod optically coupled to the color filter, the integrator rod including a reflective surface on an end of the integrator rod, the reflective surface having an aperture;
a spatial light modulator (SLM) optically coupled to the color filter; and
a phosphor wheel optically coupled to the integrator rod.

16. The system of claim 15, wherein the end of the integrator rod is a first end, the integrator rod having a second end facing the color filter.

17. The system of claim 15, wherein the aperture is round.

18. The system of claim 15, further comprising an actuator optically coupled to the spatial light modulator.

19. The system of claim 15, further comprising:
a dichroic mirror having a first side and a second side, the second side of the dichroic mirror optically coupled to the integrator rod and the first side of the dichroic mirror optically coupled to the first side of the phosphor wheel;
a light source optically coupled to the first side of the dichroic mirror; and
a series of mirrors optically coupling the second side of the phosphor wheel to the second side of the dichroic mirror.

20. The system of claim 1, wherein the reflective surface is one of a reflective internal surface of the integrator rod and a coated external surface of the integrator rod.

* * * * *